United States Patent
Do et al.

(10) Patent No.: US 10,897,686 B2
(45) Date of Patent: Jan. 19, 2021

(54) DETERMINING A TIME CALIBRATION VALUE FOR A USER EQUIPMENT

(71) Applicant: QUALCOMM Incorporated, San Diego, CA (US)

(72) Inventors: Ju-yong Do, Cupertino, CA (US); Rayman Wai Pon, Cupertino, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 15/080,481

(22) Filed: Mar. 24, 2016

(65) Prior Publication Data
US 2017/0280288 A1 Sep. 28, 2017

(51) Int. Cl.
*H04W 4/02* (2018.01)
*G01S 5/02* (2010.01)
(Continued)

(52) U.S. Cl.
CPC ............ *H04W 4/023* (2013.01); *G01S 5/021* (2013.01); *G01S 5/0221* (2013.01); *G01S 19/13* (2013.01); *G01S 19/23* (2013.01); *H04W 56/001* (2013.01)

(58) Field of Classification Search
CPC ... H04W 4/023; H04W 56/001; H04W 64/00; H04W 56/006; G01S 19/13;
(Continued)

(56) References Cited

U.S. PATENT DOCUMENTS

| 6,249,253 | B1 | 6/2001 | Nielsen et al. |
| 6,445,927 | B1 * | 9/2002 | King ........................ G01S 5/02 342/357.29 |

(Continued)

FOREIGN PATENT DOCUMENTS

| CN | 100417253 C * | 9/2008 |
| JP | 4971418 B2 | 7/2012 |
| WO | 2014124106 A1 | 8/2014 |

OTHER PUBLICATIONS

International Search Report and Written Opinion—PCT/US2017/019726—ISA/EPO—dated May 24, 2017.

*Primary Examiner* — Matthew C Sams
(74) *Attorney, Agent, or Firm* — MG-IP Law, P.C.

(57) ABSTRACT

In an embodiment, a given entity obtains a location of at least one terrestrial transmit station of a Synchronized Wireless Transmission Network (SWTN), transmit station calibration information associated with the at least one terrestrial transmit station and a location of a user equipment (UE) that is in wireless communication range with the at least one terrestrial transmit station. The given entity estimates the time calibration value for the UE based on the obtained transmit station location, the determined transmit station calibration information and the determined location of the UE. In another embodiment, a server obtains time calibration values that are estimated for each UE in the population of UEs. The server aggregates the estimated time calibration values based on device model and/or device operation mode, and calculates a representative time calibration value for UEs sharing the device model and/or device operation mode.

30 Claims, 16 Drawing Sheets

(51) Int. Cl.
*G01S 19/23* (2010.01)
*G01S 19/13* (2010.01)
*H04W 56/00* (2009.01)

(58) Field of Classification Search
CPC .. G01S 2013/466; G01S 5/021; G01S 5/0236; G01S 5/0221; G01S 5/14; G01S 19/23; G01S 13/46; G01S 19/25; G01S 19/46
See application file for complete search history.

(56) References Cited

U.S. PATENT DOCUMENTS

| | | | | |
|---|---|---|---|---|
| 6,453,168 | B1* | 9/2002 | McCrady | G01S 5/021 342/457 |
| 6,636,744 | B1* | 10/2003 | Da | G01S 1/026 342/357.29 |
| 6,667,963 | B1* | 12/2003 | Rantalainen | H04J 3/0682 370/337 |
| 6,763,241 | B2* | 7/2004 | Gous | G01S 5/0063 342/357.4 |
| 6,801,782 | B2* | 10/2004 | McCrady | G01S 5/021 375/347 |
| 7,383,049 | B2* | 6/2008 | Deloach, Jr. | G01S 5/0205 342/357.29 |
| 7,659,850 | B1* | 2/2010 | Hou | G01S 5/021 342/451 |
| 7,822,427 | B1* | 10/2010 | Hou | H04W 64/006 370/274 |
| 7,868,826 | B1 | 1/2011 | Hou et al. | |
| 8,619,672 | B2* | 12/2013 | Tsai | G01S 11/02 370/328 |
| 8,638,882 | B2* | 1/2014 | Park | H04L 27/2657 375/316 |
| 9,549,288 | B2* | 1/2017 | Werner | G01S 5/021 |
| 9,699,611 | B1* | 7/2017 | Zhang | G01S 5/021 |
| 2001/0053699 | A1* | 12/2001 | McCrady | G01S 5/021 455/513 |
| 2002/0037732 | A1* | 3/2002 | Gous | G01S 5/0063 455/502 |
| 2003/0125044 | A1* | 7/2003 | Deloach, Jr. | G01S 5/0205 455/456.1 |
| 2003/0125045 | A1 | 7/2003 | Riley et al. | |
| 2003/0125046 | A1* | 7/2003 | Riley | G01S 5/0205 455/456.1 |
| 2003/0148761 | A1* | 8/2003 | Gaal | G01S 19/05 455/423 |
| 2003/0157943 | A1* | 8/2003 | Sabat, Jr. | H04B 7/2606 455/456.1 |
| 2006/0009235 | A1 | 1/2006 | Sheynblat et al. | |
| 2007/0252761 | A1 | 11/2007 | Koorapaty et al. | |
| 2007/0254676 | A1* | 11/2007 | Pedigo | G01S 19/05 455/456.6 |
| 2010/0009696 | A1* | 1/2010 | Fok | H04W 64/00 455/456.1 |
| 2011/0043406 | A1 | 2/2011 | Duffett-Smith et al. | |
| 2011/0176483 | A1* | 7/2011 | Palanki | H04W 56/0015 370/328 |
| 2012/0106576 | A1* | 5/2012 | Hadzic | H04J 3/0697 370/503 |
| 2012/0252463 | A1 | 10/2012 | Zou et al. | |
| 2013/0272455 | A1* | 10/2013 | HomChaudhuri | H04L 27/2647 375/340 |
| 2013/0288711 | A1* | 10/2013 | Meredith | G01S 5/0252 455/456.1 |
| 2014/0185520 | A1* | 7/2014 | Gao | H04W 64/00 370/328 |
| 2014/0221005 | A1 | 8/2014 | Marshall et al. | |
| 2014/0295881 | A1* | 10/2014 | Werner | H04W 4/023 455/456.1 |
| 2015/0195674 | A1 | 7/2015 | Opshaug et al. | |

* cited by examiner

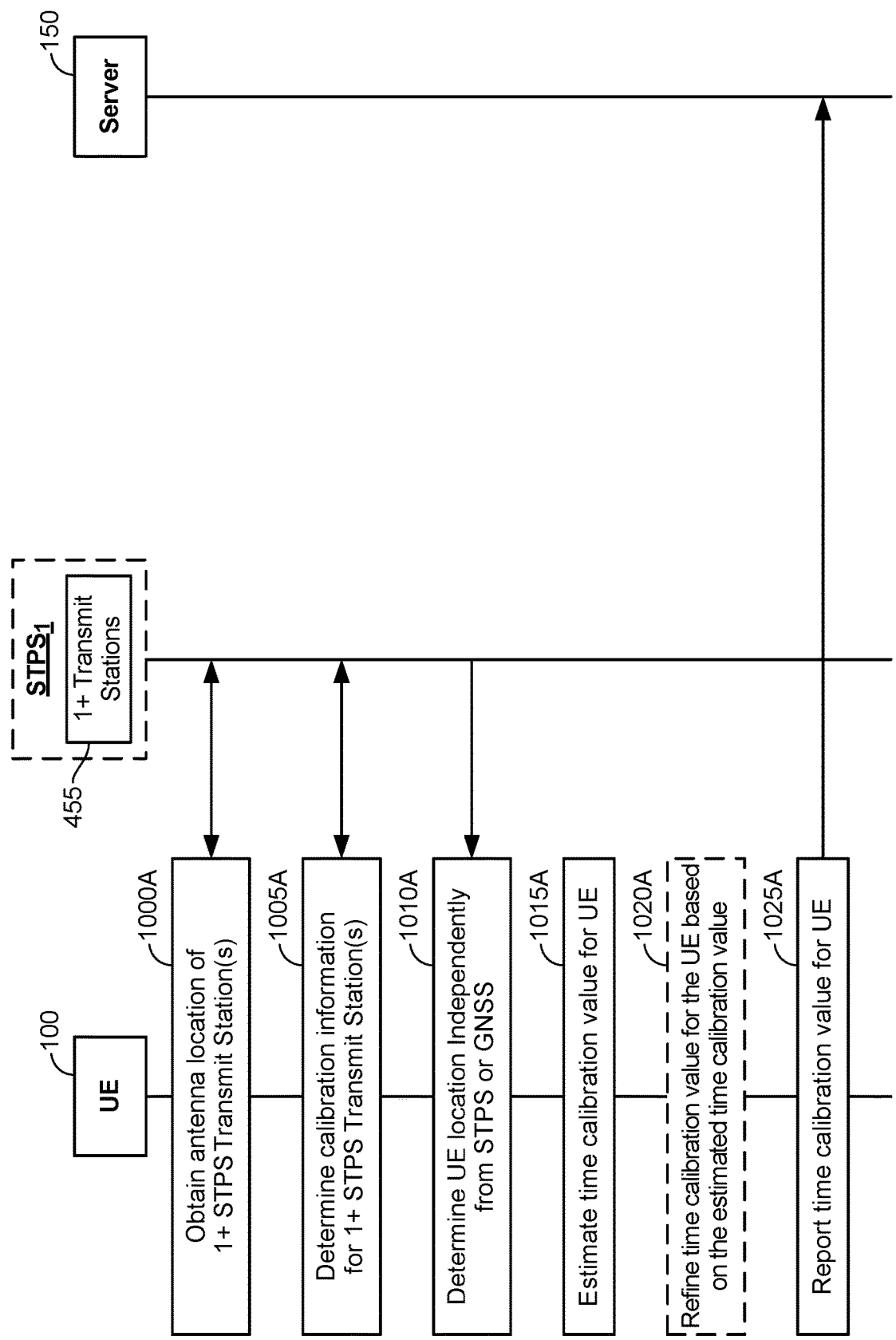

DETERMINING A TIME CALIBRATION VALUE FOR A USER EQUIPMENT

BACKGROUND

1. Field of the Disclosure

Embodiments relate to determining a time calibration value for a user equipment (UE).

2. Description of the Related Art

It is often desirable to know the location of a user equipment (UE) (or mobile device) such as a cellular phone. For example, a location services (LCS) client may desire to know the location of a UE in the case of an emergency services call or to provide some service to the user of the UE such as navigation assistance or direction finding. The terms "location" and "position" are synonymous and are used interchangeably herein. One method of determining the location of a UE is based on measurements of the times of signal arrival from multiple antennas. For example, a UE may measure time differences in received signals from a plurality of base station antennas. Because positions of the base station antennas are known, the observed time differences may be used to calculate the location of the UE. A UE may make use of a Base Station Almanac (BSA) to perform measurement calculations and/or may send the measurements to a location server for position calculation. The term Advanced Forward Link Trilateration (AFLT) is used to describe terrestrial positioning in Code Division Multiple Access (CDMA) systems, while the term Observed Time Difference of Arrival (OTDOA) is used in the context of Wideband CDMA (WCDMA) and Long Term Evolution (LTE) systems. The accuracy in terrestrial positioning is dependent on synchronization of base station clocks and signal transmissions.

Conventionally, a time calibration value that corresponds to a device-specific time offset due to processing of downlink or forward-link positioning system signals in a receiver of the UE can be manually calculated for a particular UE by a manufacturer of the UE. The time calibration value addresses variations in hardware and/or software that can result in different processing delays at receivers of different UEs. For example, time calibration values can vary between UEs based upon hardware variations (e.g., antenna types, pre-filtering, processor type and/or strength), the firmware used for low-level processing, measurement engine software, and so on. Manually estimating time calibration values for each UE at the manufacturer is expensive and may also slow the manufacturing process.

SUMMARY

An embodiment is directed to a method of estimating a time calibration value for a user equipment (UE) at a given entity, including obtaining a location of at least one terrestrial transmit station of a Synchronized Wireless Transmission Network (SWTN), determining transmit station calibration information associated with the at least one terrestrial transmit station, determining a location of the UE that is in wireless communication range with the at least one terrestrial transmit station and estimating the time calibration value for the UE based on the obtained transmit station location, the determined transmit station calibration information and the determined location of the UE.

Another embodiment is directed to a method of operating a server that is configured to track time calibration value data for a population of UEs deployed in a wireless communications system, including obtaining time calibration values that are estimated for each UE in the population of UEs, determining, for each UE of the population of UEs, a device model and/or a device operation mode, aggregating each of the estimated time calibration values into one of a plurality of aggregated time calibration value groups based on the determined device model and/or device operation mode, each of the plurality of aggregated time calibration value groups being associated with a different device model and/or a different device operation mode and calculating a representative time calibration value for at least one aggregated time calibration value group based on the group-specific time calibration values that are aggregated for the at least one aggregated time calibration value group.

Another embodiment is directed to a given entity configured to estimate a time calibration value for a UE, including a processor, memory and transceiver circuitry configured to obtain a location of at least one terrestrial transmit station of a SWTN, determine transmit station calibration information associated with the at least one terrestrial transmit station, determine a location of the UE that is in wireless communication range with the at least one terrestrial transmit station and estimate the time calibration value for the UE based on the obtained transmit station location, the determined transmit station calibration information and the determined location of the UE.

Another embodiment is directed to a server that is configured to track time calibration value data for a population of UEs deployed in a wireless communications system, a processor, memory and transceiver circuitry configured to obtain time calibration values that are estimated for each UE in the population of UEs, determine, for each UE of the population of UEs, a device model and/or a device operation mode, aggregate each of the estimated time calibration values into one of a plurality of aggregated time calibration value groups based on the determined device model and/or device operation mode, each of the plurality of aggregated time calibration value groups being associated with a different device model and/or a different device operation mode and calculate a representative time calibration value for at least one aggregated time calibration value group based on the group-specific time calibration values that are aggregated for the at least one aggregated time calibration value group.

BRIEF DESCRIPTION OF THE DRAWINGS

A more complete appreciation of embodiments of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 10A illustrates an example implementation of the process of FIG. 6 being performed by the UE in accordance with another embodiment of the disclosure.

DETAILED DESCRIPTION

Figure 1:
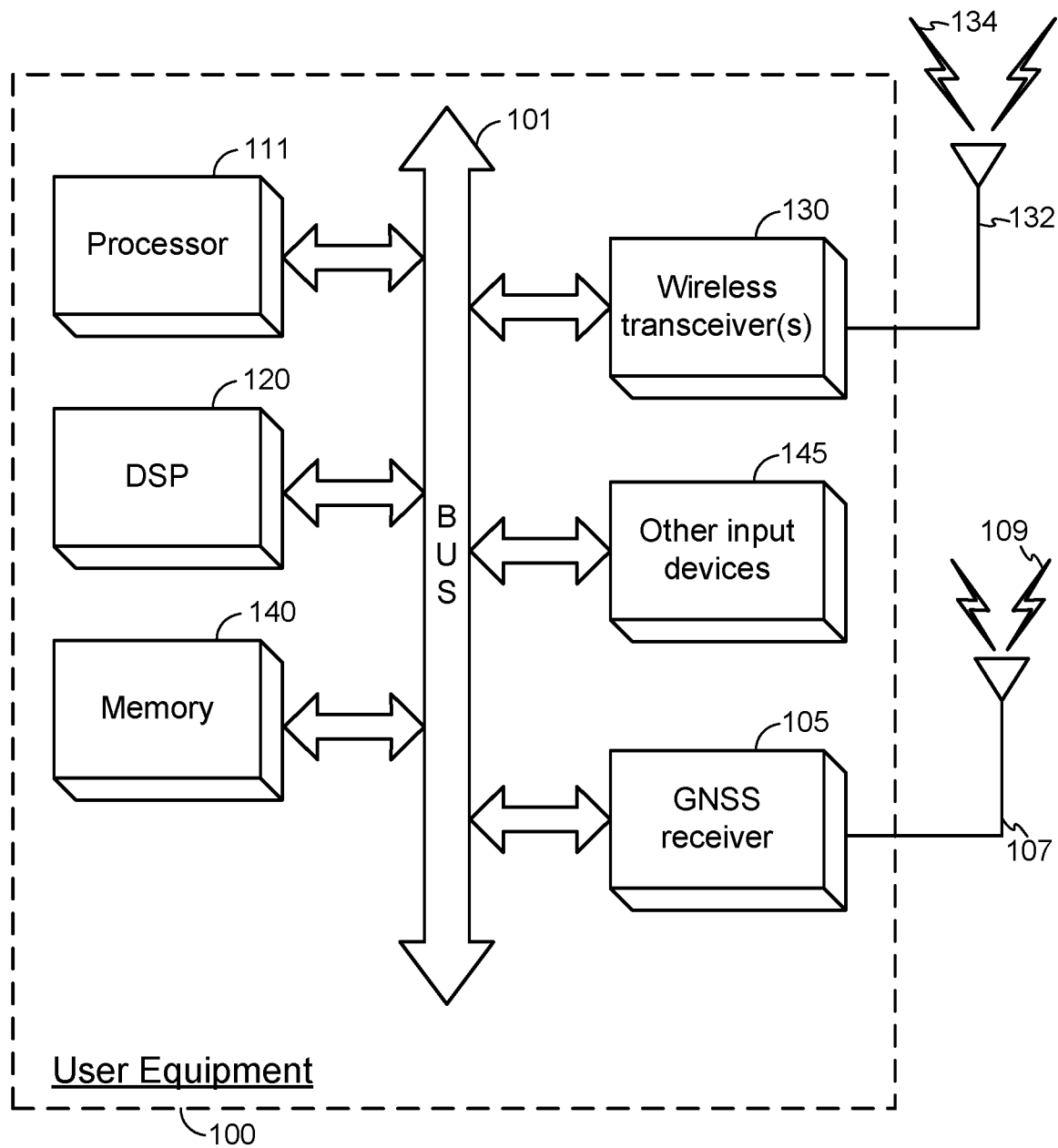
FIG. 1 illustrates block diagram of a UE in accordance with an embodiment of the disclosure.

An embodiment of the disclosure is directed to estimation of a time calibration value that corresponds to a device-specific time offset due to processing of downlink or forward-link positioning system signals in a receiver of a user equipment (UE). A location of at least one terrestrial transmit station of a Synchronized Wireless Transmission Network (SWTN) is used in combination with a determined location of the UE to estimate the time calibration value of the UE. In a further embodiment, a network server calculates a representative time calibration value for a group of UEs sharing the same model and/or device operation mode based upon time calibration values that are estimated for individual UEs in the group. Below, example device configurations and/or network architecture is described with respect to FIGS. 1-5, followed by a series of flowcharts between FIGS. 6-12 that emphasize different aspects of the embodiments.

Aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile device", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of a UE 100 in accordance with an embodiment of the disclosure. The UE 100 can include or implement the functionality of various mobile communication and/or computing devices; examples include, but are not limited to, tablets, smartphones, portable navigation devices, network enabled wrist watches, etc., whether presently existing or developed in the future. The UE 100 includes a processor 111 (or processor core), one or more Digital Signal Processors (DSP) 120, and a memory unit 140. The UE 100 may also include one or more wireless transceivers 130 configured to send and receive wireless signals 134 via a wireless antenna 132 over a wireless network. The wireless transceiver(s) 130 is connected to a bus 101. Here, the UE 100 is illustrated as having a single wireless transceiver 130. However, a UE 100 can alternatively have multiple wireless transceivers 130 and wireless antennas 132 to support multiple communication standards such as WiFi, CDMA, Wideband CDMA (WCDMA), Long Term Evolution (LTE), Bluetooth short-range wireless communication technology, etc.

Referring to FIG. 1, the wireless transceiver(s) 130 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

Referring to FIG. 1, the UE 100 also includes a Global Navigation Satellite System (GNSS) receiver 105 that receives satellite positioning system (SPS) signals 109 (e.g., from SPS satellites) via an SPS antenna 107. The GNSS receiver 105 can communicate with a single global navigation satellite system (GNSS) or multiple such systems. A GNSS can include, but is not limited to, Global Positioning System (GPS), Galileo, Glonass, Beidou (Compass), etc. SPS satellites are also referred to as satellites, space vehicles (SVs), etc. The GNSS receiver 105 processes, in whole or in part, the SPS signals 109 and uses these SPS signals 109 to determine the location of the UE 100. The processor 111, DSP 120, and memory unit 140, and/or specialized processor(s) (not shown) may also be utilized to process the SPS signals 109, in whole or in part, and/or to calculate the location of the UE 100, in conjunction with the GNSS receiver 105. Storage of information from the SPS signals 109 or other location signals is performed using the memory unit 140 or registers (not shown). While only one processor 111, DSP 120, and the memory unit 140 are shown in FIG. 1, more than one of any, a pair, or all of these components could be used by the UE 100.

Referring to FIG. 1, the memory unit 140 can include a non-transitory computer-readable storage medium (or media) that stores functions as one or more instructions or code. Media that can make up the memory unit 140 include, but are not limited to, RAM, ROM, FLASH, disc drives, etc. In general, the functions stored by the memory unit 140 are executed by the processor 111, DSP 120, or other specialized processors. Thus, the memory unit 140 is a processor-readable memory and/or a computer-readable memory that stores software (programming code, instructions, etc.) configured to cause the processor 111 to perform the functions described herein. Alternatively, one or more functions of the UE 100 may be performed in whole or in part in hardware.

Referring to FIG. 1, the UE 100 can estimate its current position within an associated system using various techniques, based on other communication entities within view and/or information available to the UE 100. For instance, a UE 100 can estimate its position using information obtained from access points (APs) associated with one or more wireless local area networks (LANs), personal area networks (PANs) utilizing a short-range wireless communication technology such as Bluetooth or ZigBee®, etc., SPS satellites, inertial navigation sensors (e.g., accelerometers, gyroscopes, magnetometer), and/or map constraint data obtained from a map server or LCS server. One or more of these techniques may be used to determine an a priori position of the UE 100.

Referring to FIG. 1, the UE 100 includes one or more other input devices 145 such as a touch display, microphone, camera, accelerometers, solid state compass, pressure sensor, magnetometer, gyroscope, and other tactile devices (e.g., buttons, knobs) configured to receive kinetic, electrical and/or magnetic input.

Figure 2:
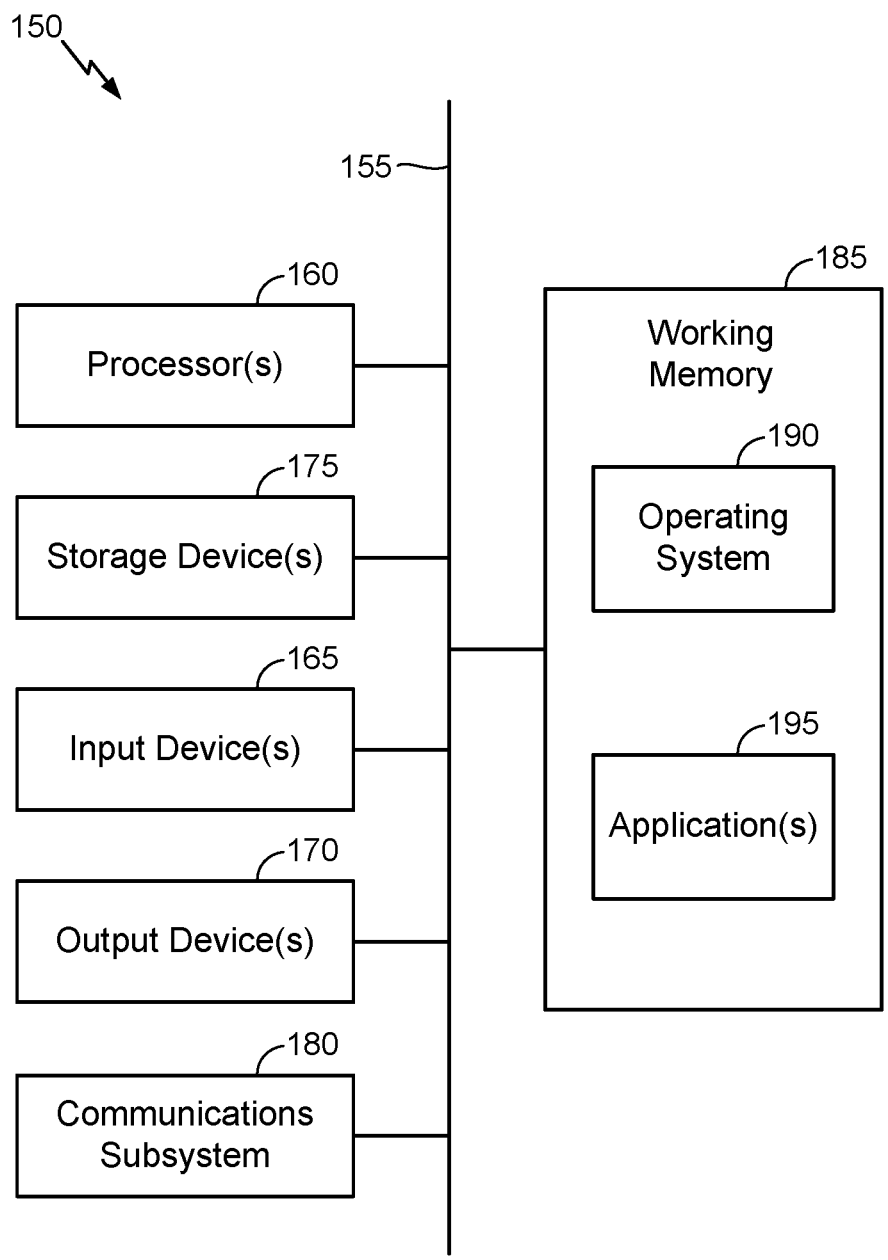
FIG. 2 illustrates a server in accordance with an embodiment of the disclosure.

FIG. 2 illustrates a server 150 (e.g., a location server) in accordance with an embodiment of the disclosure. FIG. 2 provides a generalized illustration of various components, any or all of which may be utilized as appropriate. FIG. 2 therefore, broadly illustrates how individual system elements may be implemented in a relatively separated or relatively more integrated manner.

Referring to FIG. 2, the server 150 is shown comprising hardware elements that can be electrically coupled via a bus 155 (or may otherwise be in communication, as appropriate). The hardware elements may include one or more processors 160, including without limitation one or more general-purpose processors and/or one or more special-purpose processors (such as digital signal processing chips, graphics acceleration processors, and/or the like); one or more input devices 165, which can include without limitation a mouse, a keyboard and/or the like; and one or more output devices 170, which can include without limitation a display device, a printer and/or the like. The processor(s) 160 can include, for example, intelligent hardware devices, e.g., a central processing unit (CPU) such as those made by Intel® Corporation or AMD®, a microcontroller, an ASIC, etc. Other processor types could also be utilized.

Referring to FIG. 2, the server 150 may further include (and/or be in communication with) one or more non-transitory storage devices 175, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

Referring to FIG. 2, the server 150 might also include a communications subsystem 180, which can include without limitation a modem, a network card (wireless or wired), an infrared communication device, a wireless communication device and/or chipset (such as a Bluetooth short-range wireless communication technology transceiver/device, an 802.11 device, a WiFi device, a WiMax device, cellular communication facilities, etc.), and/or the like. The communications subsystem 180 may permit data to be exchanged with a network (such as the network described below, to name one example), other servers, and/or any other devices described herein. In many embodiments, the server 150 will further comprise, as illustrated here, a working memory 185, which can include a RAM or ROM device, as described above.

Referring to FIG. 2, the server 150 also can comprise software elements, shown as being currently located within the working memory 185, including an operating system 190, device drivers, executable libraries, and/or other code, such as one or more application programs 195, which may comprise computer programs provided by various embodiments, and/or may be designed to implement methods, and/or configure systems, provided by other embodiments, as described herein. Merely by way of example, one or more processes described herein might be implemented as code and/or instructions executable by a computer (and/or a processor within a computer). Such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 175 described above. In some cases, the storage medium might be incorporated within a server, such as the server 150. In other embodiments, the storage medium might be separate from a server (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the server 150 and/or might take the form of source and/or installable code, which, upon compilation and/or installation on the server 150 (e.g., using any of a variety of generally available compilers, installation programs, compression/decompression utilities, etc.) then takes the form of executable code.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Referring to FIG. 2, the server 150 may be used to perform methods in accordance with the disclosure. Some or all of the procedures of such methods may be performed by the server 150 in response to the processor(s) 160 executing one or more sequences of one or more instructions (which might be incorporated into the operating system 190 and/or other code, such as application programs 195) contained in the working memory 185. Such instructions may be read into the working memory 185 from another computer-readable medium, such as one or more of the non-transitory storage device(s) 175. Merely by way of example, execution of the sequences of instructions contained in the working memory 185 might cause the processor(s) 160 to perform one or more procedures of the methods described herein.

Figure 3:
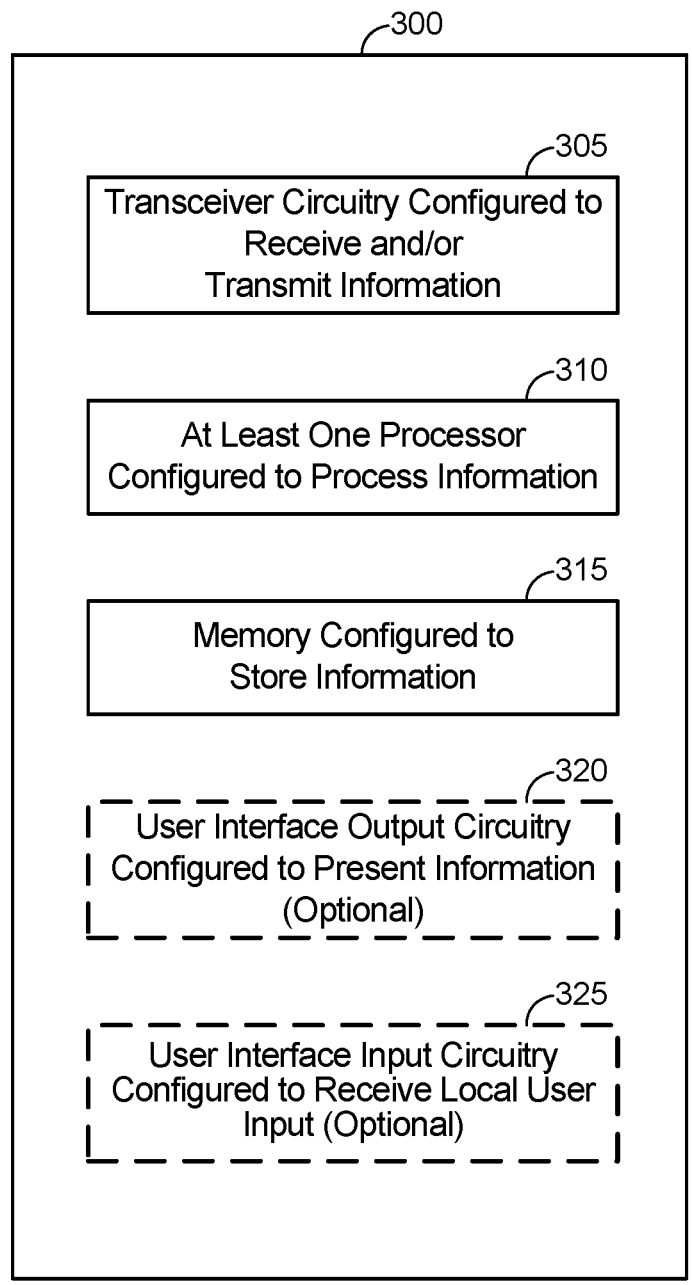
FIG. 3 illustrates a communication device that includes structural components to perform functionality.

FIG. 3 illustrates a communication device 300 that includes structural components to perform functionality. The communication device 300 can correspond to any of the above-noted communication devices, including but not limited to the UE 100 of FIG. 1 and/or the server 150 of FIG. 2. The communication device 300 may further correspond to an SPS satellite transmit station, any component included in a radio access network (RAN) such as base stations, access points or eNodeBs, any component of a core network, and so on.

Referring to FIG. 3, the communication device 300 includes transceiver circuitry configured to receive and/or transmit information 305. In an example, if the communication device 300 corresponds to a wireless communications device (e.g., the UE 100), the transceiver circuitry configured to receive and/or transmit information 305 can include a wireless communications interface (e.g., Bluetooth, WiFi, WiFi Direct, Long-Term Evolution (LTE) Direct, etc.) such as a wireless receiver or transceiver and associated hardware (e.g., an RF antenna, a MODEM, a modulator and/or demodulator, GNSS receiver, etc.). In another example, the transceiver circuitry configured to receive and/or transmit information 305 can correspond to a wired communications interface (e.g., a serial connection, a USB or Firewire connection, an Ethernet connection through which the Internet can be accessed, etc.). Thus, if the communication device 300 corresponds to some type of network-based server (e.g., the server 150), the transceiver circuitry configured to receive and/or transmit information 305 can correspond to an Ethernet card, in an example, that connects the network-based server to other communication entities via an Ethernet protocol. In a further example, the transceiver circuitry configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The transceiver circuitry configured to receive and/or transmit information 305 can also include software that, when executed, permits the associated hardware of the transceiver circuitry configured to receive and/or transmit information 305 to perform its reception and/or transmission function(s). However, the transceiver circuitry configured to receive and/or transmit information 305 does not correspond to software alone, and the transceiver circuitry configured to receive and/or transmit information 305 relies at least in part upon structural hardware to achieve its functionality. Moreover, the transceiver circuitry configured to receive and/or transmit information 305 may be implicated by language other than "receive" and "transmit", so long as the underlying function corresponds to a receive or transmit function. For example, functions such as obtaining, acquiring, retrieving, measuring, etc., may be performed by the transceiver circuitry configured to receive and/or transmit information 305 in certain contexts as being specific types of receive functions. In another example, functions such as sending, delivering, conveying, forwarding, etc., may be performed by the transceiver circuitry configured to receive and/or transmit information 305 in certain contexts as being specific types of transmit functions. Other functions that correspond to other types of receive and/or transmit functions may also be performed by the transceiver circuitry configured to receive and/or transmit information 305.

Referring to FIG. 3, the communication device 300 further includes at least one processor configured to process information 310. Example implementations of the type of processing that can be performed by the at least one processor configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the at least one processor configured to process information 310 can include a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the at least one processor configured to process information 310 may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The at least one processor configured to process information 310 can also include software that, when executed, permits the associated hardware of the at least one processor configured to process information 310 to perform its processing function(s). However, the at least one processor configured to process information 310 does not correspond to software alone, and the at least one processor configured to process information 310 relies at least in part upon structural hardware to achieve its functionality. Moreover, the at least one processor configured to process information 310 may be implicated by language other than "processing", so long as the underlying function corresponds to a processing function. For example, functions such as evaluating, determining, calculating, identifying, etc., may be performed by the at least one processor configured to process information 310 in certain contexts as being specific types of processing functions. Other functions that correspond to other types of processing functions may also be performed by the at least one processor configured to process information 310.

Referring to FIG. 3, the communication device 300 further includes memory configured to store information 315. In an example, the memory configured to store information 315 can include at least a non-transitory memory and associated hardware (e.g., a memory controller, etc.). For example, the non-transitory memory included in the memory configured to store information 315 can correspond to RAM, flash memory, ROM, erasable programmable ROM (EPROM), EEPROM, registers, hard disk, a removable disk, a CD-ROM, or any other form of storage medium known in the art. The memory configured to store information 315 can also include software that, when executed, permits the associated hardware of the memory configured to store information 315 to perform its storage function(s). However, the memory configured to store information 315 does not correspond to software alone, and the memory configured to store information 315 relies at least in part upon structural hardware to achieve its functionality. Moreover, the memory configured to store information 315 may be implicated by language other than "storing", so long as the underlying function corresponds to a storing function. For example, functions such as caching, maintaining, etc., may be performed by the memory configured to store information 315 in certain contexts as being specific types of storing functions. Other functions that correspond to other types of storing functions may also be performed by the memory configured to store information 315.

Referring to FIG. 3, the communication device 300 further optionally includes user interface output circuitry configured to present information 320. In an example, the user interface output circuitry configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the UE 100 of FIG. 1, the user interface output circuitry configured to present information 320 can include a display screen and/or touchscreen. In a further example, the user interface output circuitry configured to present information 320 can be omitted for certain communication devices, such as network communication devices that do not have a local user (e.g., network switches or routers, remote servers, etc.). The user interface output circuitry configured to present information 320 can also include software that, when executed, permits the associated hardware of the user interface output circuitry configured to present information 320 to perform its presentation function(s). However, the user interface output circuitry configured to present information 320 does not correspond to software alone, and the user interface output circuitry configured to present information 320 relies at least in part upon structural hardware to achieve its functionality. Moreover, the user interface output circuitry configured to present information 320 may be implicated by language other than "presenting", so long as the underlying function corresponds to a presenting function. For example, functions such as displaying, outputting, prompting, conveying, etc., may be performed by the user interface output circuitry configured to present information 320 in certain contexts as being specific types of presenting functions. Other functions that correspond to other types of storing functions may also be performed by the user interface output circuitry configured to present information 320.

Referring to FIG. 3, the communication device 300 further optionally includes user interface input circuitry configured to receive local user input 325. In an example, the user interface input circuitry configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the UE 100 of FIG. 1, the user interface input circuitry configured to receive local user input 325 can include buttons, a touchscreen, etc. In a further example, the user interface input circuitry configured to receive local user input 325 can be omitted for certain communication devices, such as network communication devices that do not have a local user (e.g., network switches or routers, remote servers, etc.). The user interface input circuitry configured to receive local user input 325 can also include software that, when executed, permits the associated hardware of the user interface input circuitry configured to receive local user input 325 to perform its input reception function(s). However, the user interface input circuitry configured to receive local user input 325 does not correspond to software alone, and the user interface input circuitry configured to receive local user input 325 relies at least in part upon structural hardware to achieve its functionality. Moreover, the user interface input circuitry configured to receive local user input 325 may be implicated by language other than "receiving local user input", so long as the underlying function corresponds to a receiving local user function. For example, functions such as obtaining, receiving, collecting, etc., may be performed by the user interface input circuitry configured to receive local user input 325 in certain contexts as being specific types of receiving local user functions. Other functions that correspond to other types of receiving local user input functions may also be performed by the user interface input circuitry configured to receive local user input 325.

Referring to FIG. 3, while the configured structural components of 305 through 325 are shown as separate or distinct blocks that are implicitly coupled to each other via an associated communication bus (not shown expressly), it will be appreciated that the hardware and/or software by which the respective configured structural components of 305 through 325 performs their respective functionality can overlap in part. For example, any software used to facilitate the functionality of the configured structural components of 305 through 325 can be stored in the non-transitory memory associated with the memory configured to store information 315, such that the configured structural components of 305 through 325 each performs their respective functionality (i.e., in this case, software execution) based in part upon the operation of software stored by the memory configured to store information 315. Likewise, hardware that is directly associated with one of the configured structural components of 305 through 325 can be borrowed or used by others of the configured structural components of 305 through 325 from time to time. For example, the at least one processor configured to process information 310 can format data into an appropriate format before being transmitted by the transceiver circuitry configured to receive and/or transmit information 305, such that the transceiver circuitry configured to receive and/or transmit information 305 performs its functionality (i.e., in this case, transmission of data) based in part upon the operation of structural hardware associated with the at least one processor configured to process information 310.

Accordingly, the various structural components of 305 through 325 are intended to invoke an aspect that is at least partially implemented with structural hardware, and are not intended to map to software-only implementations that are independent of hardware and/or to non-structural functional interpretations. Other interactions or cooperation between the structural components of 305 through 325 in the various blocks will become clear to one of ordinary skill in the art from a review of the aspects described below in more detail.

Figure 4:
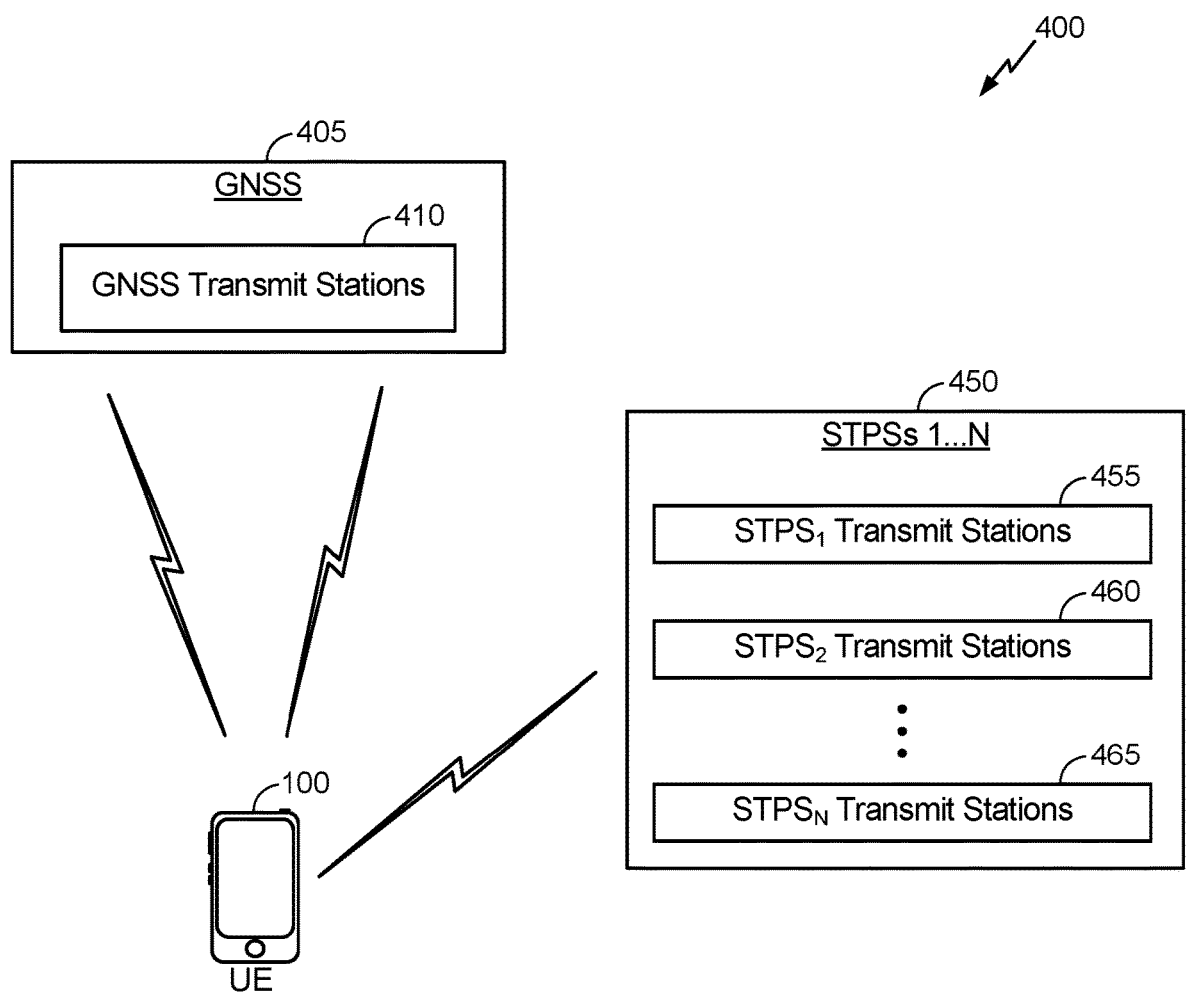
FIG. 4 illustrates a communication system in accordance with an embodiment of the disclosure.

FIG. 4 illustrates a communication system 400 in accordance with an embodiment of the disclosure. Referring to FIG. 4, the UE 100 of FIG. 1 is shown in communication with a Global Navigation Satellite System (GNSS) 405 that includes a plurality of GNSS transmit stations 410 (e.g., GNSS satellites) and also a set of Synchronized Terrestrial Positioning Systems (STPSs)$_{1 \ldots N}$ 450, where N is an integer greater than or equal to 1. Each of the STPSs$_{1 \ldots N}$ 450 includes a plurality of transmit stations (e.g., cellular base stations, synchronized WiFi access points or wireless local area networks (WLANs), etc.) that transmit signals that are capable of being used for position termination (e.g., via AFLT, etc.). In the embodiment of FIG. 4, STPS$_1$ includes transmit stations 455, STPS$_2$ includes transmit stations 460, STPS$_{3 \ldots N-1}$ (if present) each include respective transmit stations (not shown), and STPS$_N$ includes transmit stations 465. Referring back to FIG. 1, the UE 100 may communicate with the GNSS 405 via the GNSS receiver 105, and the UE 100 may communicate with one or more of STPSs$_{1 \ldots N}$ 450 via one or more of the wireless transceiver(s) 130. With respect to FIG. 4, both the GNSS 405 and the STPSs$_{1 \ldots N}$ 450 are examples of Synchronized Wireless Transmission Networks (SWTNs). The SWTNs (e.g., the GNSS 405 and STPSs$_{1 \ldots N}$ 450) described below may be frequency-synchronized only or may alternatively be both frequency-synchronized and time-synchronized.

Figure 5:
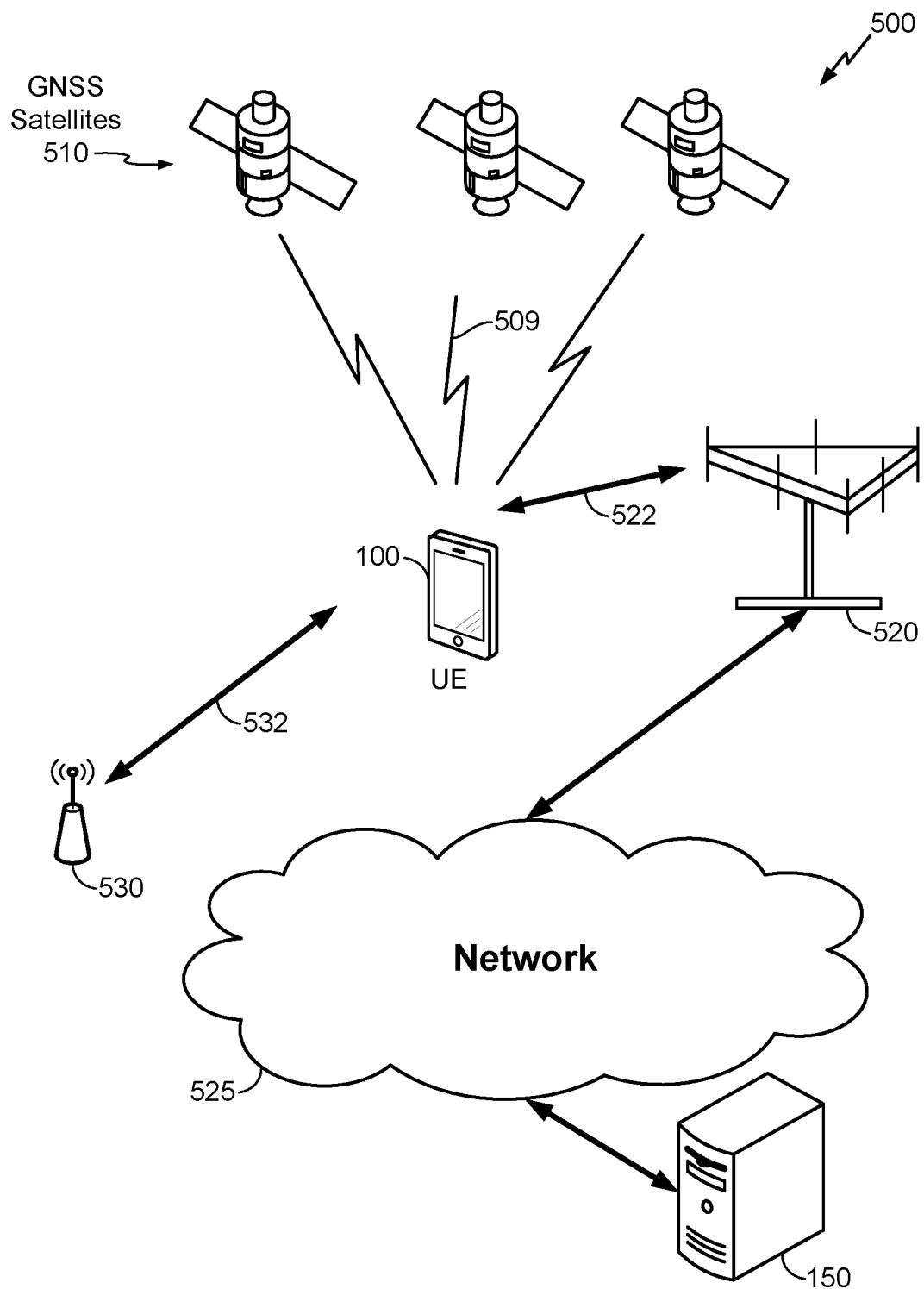
FIG. 5 illustrates a communication system in accordance with another embodiment of the disclosure.

FIG. 5 illustrates a communication system 500 in accordance with another embodiment of the disclosure. In some aspects, more specific aspects of the communication system 400 of FIG. 4 are depicted in FIG. 5, whereby the UE 100 is shown in communication with a GNSS that includes GNSS satellites 510 as well as to two STPSs that respectively include at least a local transceiver 530 and a cellular transceiver 520.

Referring to FIG. 5, the UE 100, may transmit radio signals to, and receive radio signals from, a wireless communication network. In one example, the UE 100 may communicate with a cellular communication network by transmitting wireless signals to, or receiving wireless signals from the cellular transceiver 520 which may comprise a wireless base transceiver subsystem (BTS), a Node B or an evolved NodeB (eNB) over a wireless communication link 522. Similarly, UE 100 may transmit wireless signals to, or receive wireless signals from the local transceiver 530 over a wireless communication link 532. The local transceiver 530 may comprise an access point (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth® network) or a cellular network (e.g. an LTE network or other wireless wide area network such as those discussed in the next paragraph).

Examples of network technologies that may support the wireless communication link 522 are Global System for Mobile Communications (GSM), Code Division Multiple Access (CDMA), Wideband CDMA (WCDMA), Long Term Evolution LTE), High Rate Packet Data (HRPD). GSM, WCDMA and LTE are technologies defined by 3GPP. CDMA and HRPD are technologies defined by the 3rd Generation Partnership Project 2 (3GPP2). WCDMA is also part of the Universal Mobile Telecommunications System (UMTS) and may be supported by an HNB. Cellular transceivers 520 may comprise deployments of equipment providing subscriber access to a wireless telecommunication network for a service (e.g., under a service contract). Here, a cellular transceiver 520 may perform functions of a cellular base station in servicing subscriber devices within a cell based, at least in part, on a range at which the cellular transceiver 520 is capable of providing access service. Examples of radio technologies that may support wireless communication link 522 are IEEE 802.11, Bluetooth (BT) and LTE.

In a particular implementation, cellular transceiver 520 and local transceiver 530 may communicate with one or more servers 150 over a network 525. Here, the network 525 may comprise any combination of wired or wireless links and may include cellular transceiver 520 and/or local transceiver 530 and/or one or more servers 150. In a particular implementation, network 525 may comprise Internet Protocol (IP) or other infrastructure capable of facilitating communication between UE 100 and server(s) 150 through local transceiver 530 or cellular transceiver 520. In an implementation, network 525 may comprise cellular communication network infrastructure such as, for example, a base station controller or packet based or circuit based switching center (not shown) to facilitate mobile cellular communication with UE 100. In a particular implementation, network 525 may comprise local area network (LAN) elements such as WiFi APs, routers and bridges and may in that case include or have links to gateway elements that provide access to wide area networks such as the Internet. In other implementations, network 525 may comprise a LAN and may or may not have access to a wide area network but may not provide any such access (if supported) to UE 100. In some implementations the network 525 may comprise multiple networks (e.g., one or more wireless networks and/or the Internet). In one implementation, network 525 may include one or more serving gateways or Packet Data Network gateways. In addition, one or more of server(s) 150 may be an enhanced serving mobile location center (E-SMLC), a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMES) in network 525.

In particular implementations, and as discussed below, UE 100 may have circuitry and processing resources capable of obtaining location related measurements (e.g. for signals received from GPS or other Satellite Positioning System (SPS) satellites 510, cellular transceiver 520 or local transceiver 530) and computing a position fix or estimated location (e.g., an a priori location) of UE 100 based on these location related measurements. In some implementations, location related measurements obtained by UE 100 may be transferred to a location server such as an enhanced serving mobile location center (E-SMLC) or SUPL location platform (SLP) (e.g. which may be one of the one or more servers 150) after which the location server may estimate or determine a location for UE 100 based on the measurements. In the presently illustrated example, location related measurements obtained by UE 100 may include measurements of SPS signals 509 received from satellites belonging to an SPS or GNSS such as GPS, GLONASS, Galileo or Beidou and/or may include measurements of signals (such as wireless communication links 522 and/or 532) received from terrestrial transmitters fixed at known locations (e.g., such as cellular transceiver 520). UE 100 or a separate location server may then obtain a location estimate for UE 100 based on these location related measurements using any one of several position methods such as, for example, GNSS, Assisted GNSS (A-GNSS), Advanced Forward Link Trilateration (AFLT), Observed Time Difference Of Arrival (OTDOA) or Enhanced Cell ID (E-CID) or combinations thereof. In some of these techniques (e.g. A-GNSS, AFLT and OTDOA), pseudoranges or timing differences may be measured at UE 100 relative to a threshold number (e.g., three or more) of terrestrial transmitters fixed at known locations or relative to a threshold number (e.g., four or more) satellites with accurately known orbital data, or combinations thereof, based at least in part, on pilots, positioning reference signals (PRS) or other positioning related signals transmitted by the transmitters or satellites and received at UE 100. Doppler measurements may be made to various signal sources such as the cellular transceiver 520, the local transceiver 530, and GNSS satellites 510, and various combinations therein. The one or more servers 150 may be capable of providing positioning assistance data to UE 100 including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID. One or more servers 150 may comprise an almanac which indicates locations and identities of cellular transceivers and/or local transceivers in a particular region or regions such as a particular venue, and may provide information descriptive of signals transmitted by a cellular base station or AP such as transmission power and signal timing. In the case of E-CID, UE 100 may obtain measurements of signal strengths for signals received from cellular transceiver 520 and/or local transceiver 530 and/or may obtain a round trip signal propagation time (RTT) between UE 100 and a cellular transceiver 520 or local transceiver 530. UE 100 may use these measurements together with assistance data (e.g. terrestrial almanac data or GNSS satellite data such as GNSS Almanac and/or GNSS Ephemeris information) received from the one or more servers 150 to determine a location for UE 100 or may transfer the measurements to the one or more servers 150 to perform the same determination.

Figure 6:
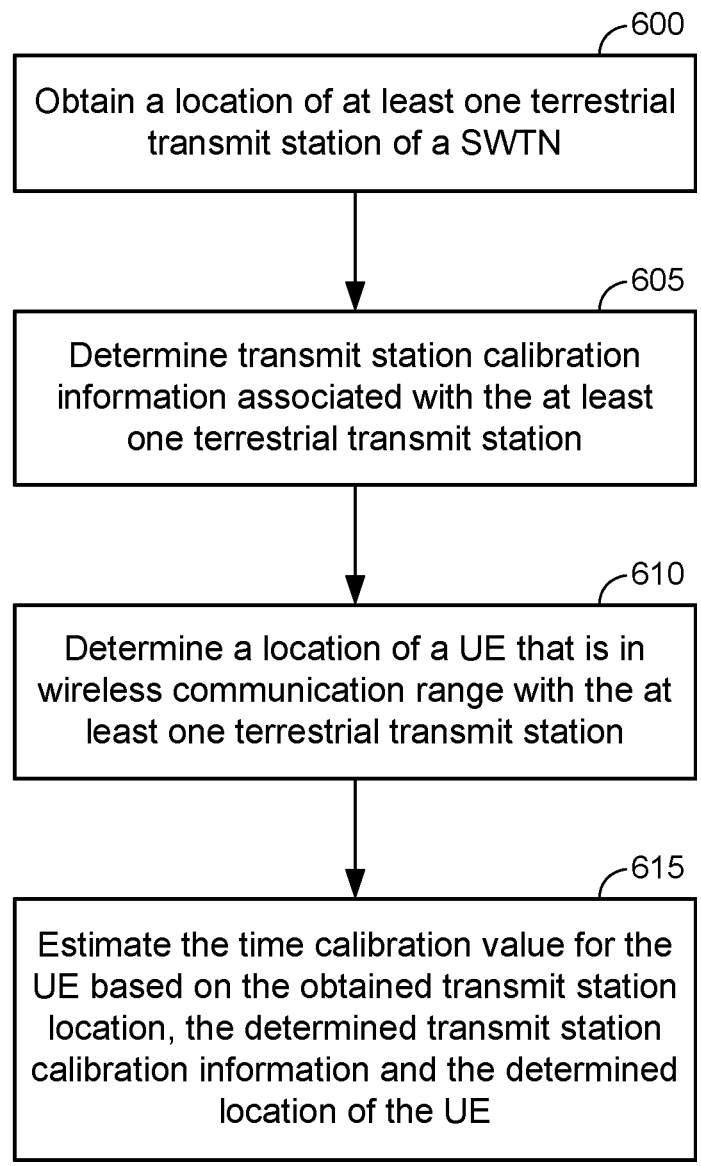
FIG. 6 illustrates a process of estimating a time calibration value for a UE in accordance with an embodiment of the disclosure.

FIG. 6 illustrates a process of estimating a time calibration value for a UE in accordance with an embodiment of the disclosure. The process of FIG. 6 is performed by a given entity that can vary based on implementation. For example, the given entity performing the process of FIG. 6 can correspond to the UE 100 (e.g., see FIGS. 7A, 8A, 9A and/or 10A) or to the server 150 (e.g., FIGS. 7B, 8B, 9B and/or 10B).

Referring to FIG. 6, the given entity obtains a location of at least one terrestrial transmit station (e.g., one or more of transmit stations 455, 460 and/or 465 of FIG. 4) of Synchronized Wireless Transmission Network (SWTN) (e.g., any of STPSs$_{1...N}$ 450 from FIG. 4), 600. The given entity determines transmit station calibration information associated with the at least one terrestrial transmit station, 605. The given entity determines a location of the UE that is in wireless communication range with the at least one terrestrial transmit station, 610. As will be appreciated, the specific order in which 600, 605 and 610 are executed can vary, and some or all of 600, 605 and 610 may be performed in parallel. The given entity estimates the time calibration value for the UE 100 based on the obtained transmit station location, the determined transmit station calibration information and the determined location of the UE 100, 615.

Figure 7A:
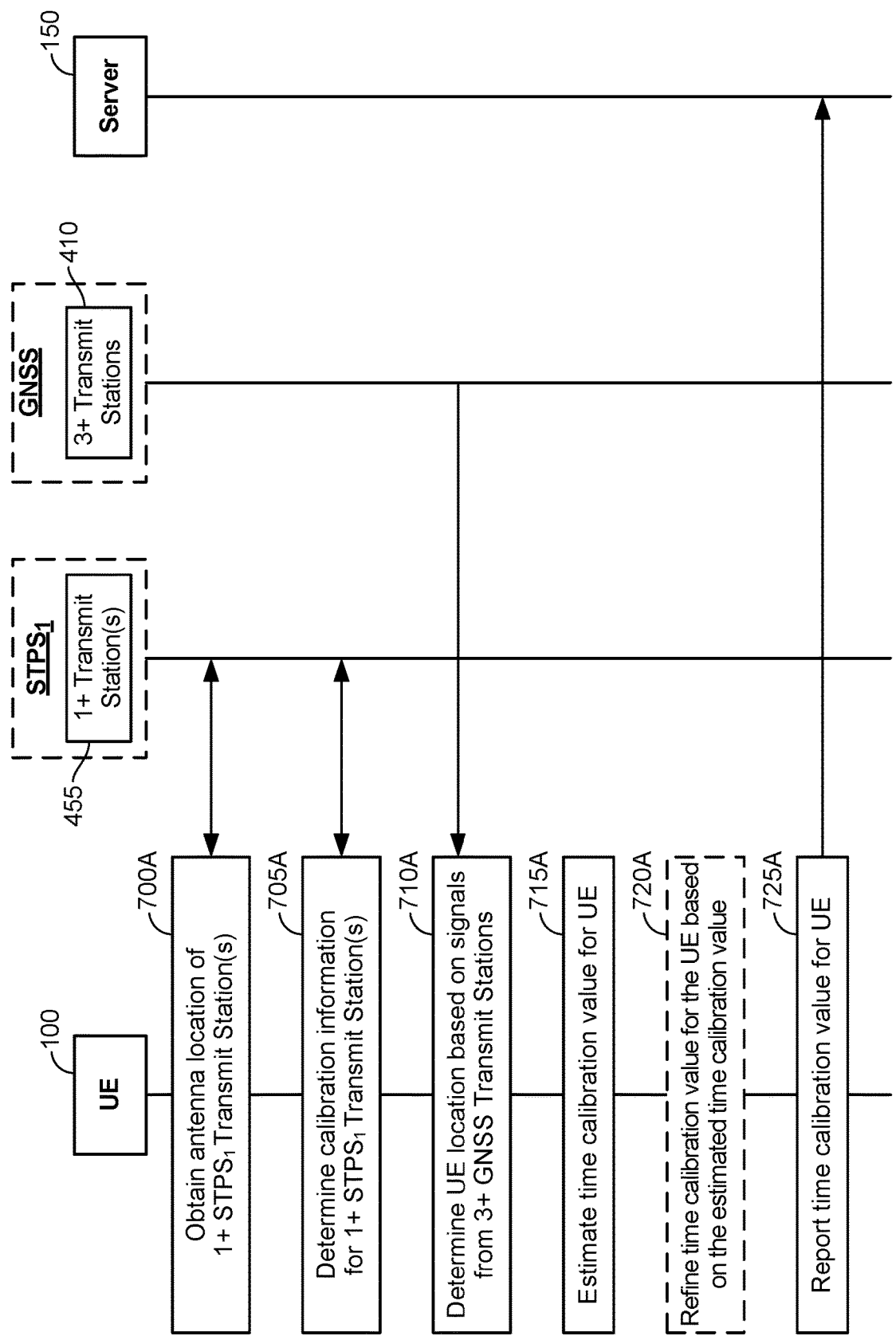
FIG. 7A illustrates an example implementation of the process of FIG. 6 being performed by the UE in accordance with an embodiment of the disclosure.

FIG. 7A illustrates an example implementation of the process of FIG. 6 whereby the given entity corresponds to the UE 100 in accordance with an embodiment of the disclosure. Referring to FIG. 7A, UE 100 obtains an antenna location of at least one STPS transmit station, 700A (e.g., similar to 600 of FIG. 6). As used herein, reference to an "antenna" location may be used to refer to the location (e.g., GPS coordinates, etc.) of an antenna of a transmit station and/or to a location of the transmit station itself (e.g., a street address, GPS coordinates, etc.). In an example, one of the servers 150 depicted in FIG. 5 may correspond to a Base Station Almanac server. The Base Station Almanac server maintains an almanac which indicates locations and identities of cellular transceivers and/or local transceivers in a particular region or regions such as a particular venue, and may provide information descriptive of signals transmitted by a cellular base station or AP such as transmission power and signal timing. Accordingly, in one example, the determination of 700A includes the UE 100 detecting and obtaining an identifier of the at least one antenna (or transmit station), and then looking up corresponding location(s) for the at least one antenna (or transmit station) from the above-noted almanac. In another example, some or all of the almanac data may be stored locally at the UE 100 (e.g., almanac data for a nearby geographic region may be pre-loaded into memory at the UE 100 to avoid network lookup requests for almanac data), and the location look-up operation may be implemented locally at the UE 100.

Referring to FIG. 7A, UE 100 determines calibration information for the at least one STPS transmit station, 705A (e.g., similar to 605 of FIG. 6). In an example, the calibration information determined at 705A may include a Forward Link Calibration (FLC) value. Similar to the location at 700A, the almanac can be configured to store a known FLC value for the at least one transmit station, in which case the FLC value can be looked-up similarly to the antenna location at 700A (e.g., using at least one associated antenna identifier via a local or remote look-up operation). In a further example, at least some of the calibration information determined at 705A may be measured by UE 100 from signals that are transmitted by the at least one STPS transmit station. In a specific example, the calibration information may include one or more Time of Arrival (TOA) measurements. In a further example, the FLC value may be calculated based on the one or more TOA measurements. The calculation may be executed at UE 100 in an example. Alternatively, UE 100 may report the TOA measurements to an external device (e.g., a server) which can return the calculated FLC value to UE 100.

Referring to FIG. 7A, UE 100 determines its current location based on signals from three or more GNSS transmit stations 410 using any well-known GNSS-based positioning technique, 710A (e.g., similar to 610 of FIG. 6). UE 100 then estimates its time calibration value, 715A (e.g., similar to 615 of FIG. 6). In an example, the estimation of 715A can be calculated based on Equation 1 as shown below:

$$\text{Time Calibration Value} = \text{TOAmeas} - (\|\text{GNSSloc} - \text{antennaloc}\| + \text{FLC}) \quad \text{Equation 1}$$

whereby TOAmeas denotes an average of the TOAs measured at 705A, GNSSloc denotes the GNSS-based location estimate from 710A, antennaloc denotes the antenna location obtained at 700A and FLC denotes the FLC value obtained at 705A.

Because the time calibration value is substantially constant (e.g., unless hardware and/or software on the UE 100 is changed, etc.), the UE 100 may refine the estimated time calibration value over time, 720A. The refining of 720A can include repeating 700A-715A a number of times to improve a confidence level associated with the estimated time calibration value. For example, the refining of 720A can include weighted averaging of estimated time calibration values, with weights established as shown below with respect to Equation 2:

$$\text{Weight} = \text{sqrt}(\text{TOAmeas\_UNC}^2 + \text{GNSSLoc\_UNC}^2 + \text{antennaloc\_UNC}^2 + \text{FLC\_UNC}^2) \quad \text{Equation 2}$$

whereby TOAmeas_UNC, GNSSLoc_UNC, antennaloc_UNC, FLC_UNC denote respective uncertainty levels in the TOAmeas, GNSSloc, antennaloc and FLC, respectively.

Referring to FIG. 7A, a time calibration value for UE 100 may then be reported to the server 150 at 725A. The reported time calibration value at 725A can correspond to the estimated time calibration value from 715A without refinement, i.e., a "raw" estimated time calibration value (in which case, while not shown in FIG. 7A, any refining or weighting can occur at the server 150). Alternatively, the reported time calibration value at 725A can correspond to the refined or weighted time calibration value from 720A once a threshold level of certainty (or confidence level) is reached. In a further example, the refinement of 720A can also be optional if the estimated time calibration value happens to be associated with a very high certainty or confidence level (e.g., already above the confidence threshold used to trigger reporting at 725A). Alternatively, the time calibration value estimated at 715A and/or refined at 720A need not be reported to the server 150 at all. Rather, UE 100 can estimate and/or refine the time calibration for its own independent use (e.g., no crowdsourcing via the server 150).

Figure 7B:
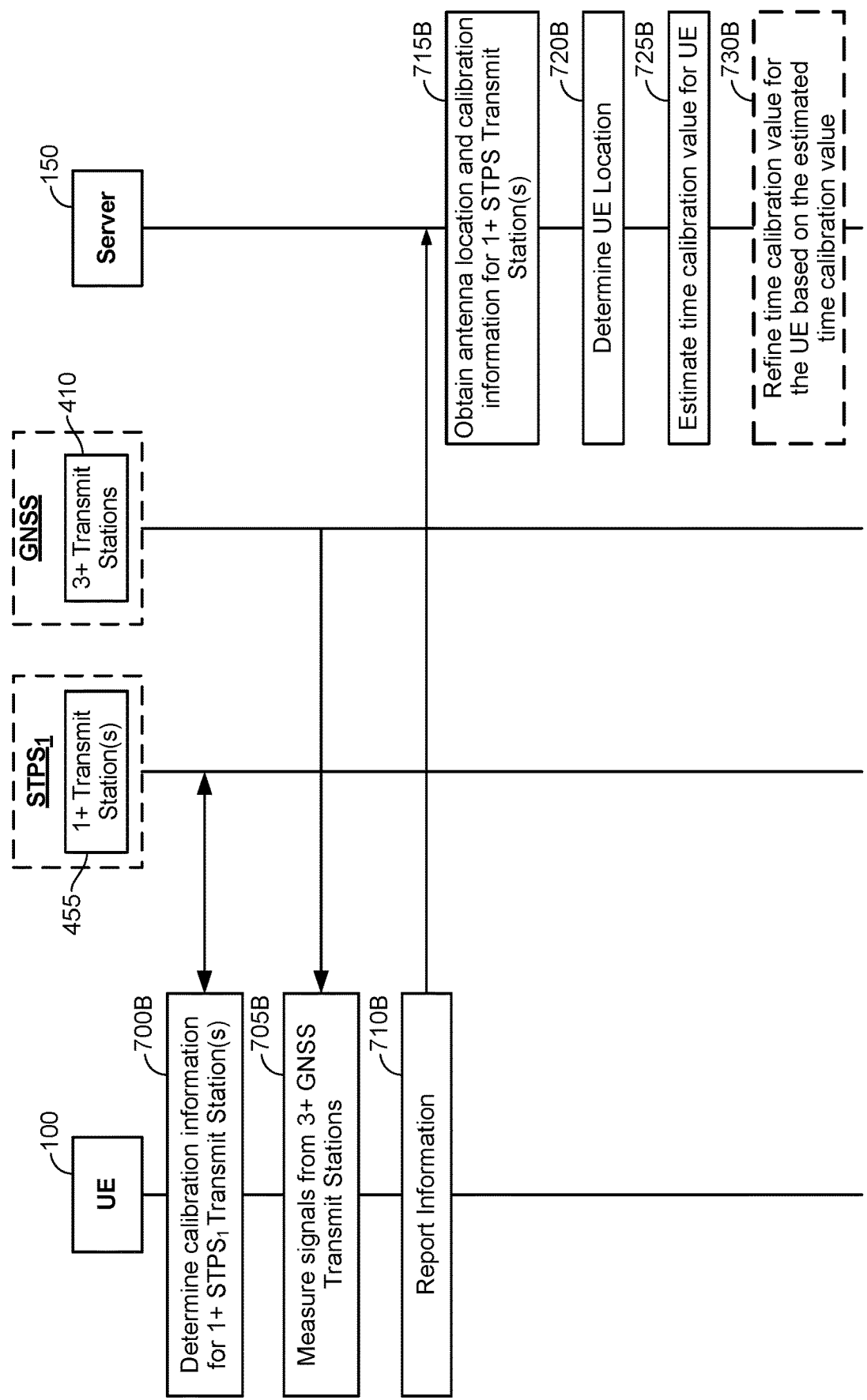
FIG. 7B illustrates an example implementation of the process of FIG. 6 being performed by a server in accordance with an embodiment of the disclosure.

FIG. 7B illustrates an example implementation of the process of FIG. 6 whereby the given entity corresponds to the server 150 in accordance with an embodiment of the disclosure. Referring to FIG. 7B, UE 100 determines calibration information for the at least one STPS transmit station 455, 700B, measures signals from three or more GNSS transmit stations 410, 705B, and then reports information to the server 150, 710B.

In an example, the calibration information determined at 700B can be similar to the calibration information determined at 705A of FIG. 7A. Alternatively, the actual look-up operation for some of the calibration information (e.g., such as the FLC value) may occur at the server 150 instead. Similarly, the antenna location obtained by the UE 100 at 700A of FIG. 7A can be determined at UE 100 and then reported to the server 150 at 710B, or the server 150 can look-up the antenna location on its own (e.g., based on a transmit station identifier carried in the reported information of 710B). Similarly, UE 100 may determine its location and then send the determined location to the server 150 at 710B, or alternatively UE 100 may send the raw GNSS measurements from 705B to the server 150 so that the server 150 can perform the UE location calculation.

With this in mind, the server 150 obtains the antenna location and calibration information for the at least one STPS transmit station, 715B (e.g., either based on extracting this information from the reported information received at 710B, or separately looking up and/or calculating the relevant information based at least in part upon the reported information from 710B), and the server 150 further determines the current location of UE 100, 720B (e.g., either based on extracting this information from the reported information received at 710B, or separately calculating the relevant information based at least in part upon raw GNSS signal measurements received at 710B). The server 150 then estimates the time calibration value for UE 100 based on Equation 1 similarly to 715A of FIG. 7A, 725B. As will be appreciated, 715B-725B correspond to an example implementation of 600-615 of FIG. 6. The server 150 then optionally refines the estimated time calibration value for UE 100, 730B (e.g., similar to 720A of FIG. 7A). In particular, the refining of 730B can include repeating 715B-725B based on different reported information from 710B a number of times to improve a confidence level associated with the estimated time calibration value. In a further example, the refinement of 730B can be optional if the estimated time calibration value happens to be associated with a very high certainty or confidence level. In yet another example, once the estimated time calibration value (refined or otherwise) exceeds a particular confidence level, the estimated time calibration value may be deemed to have matured, at which point UE 100 may be authorized to use the estimated time calibration value to compensate TOA measurements for positioning procedures (e.g., GNSS-based, STPS-based and/or hybrid positioning procedures).

Figure 8A:
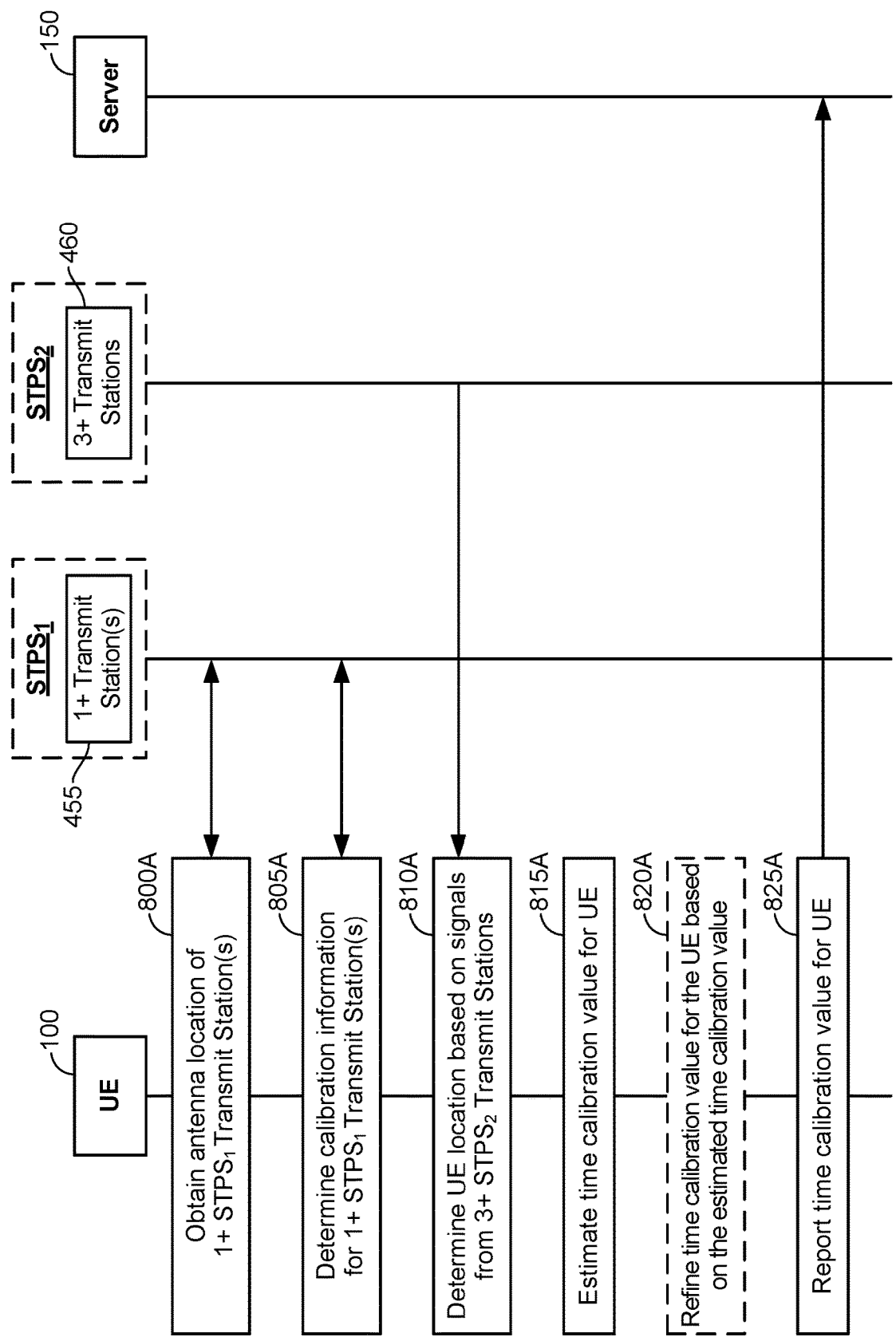
FIG. 8A illustrates an example implementation of the process of FIG. 6 being performed by the UE in accordance with another embodiment of the disclosure.

FIG. 8A illustrates an example implementation of the process of FIG. 6 whereby the given entity corresponds to the UE 100 in accordance with another embodiment of the disclosure. Referring to FIG. 8A, UE 100 obtains an antenna location of at least one STPS transmit station, 800A (e.g., similar to 600 of FIG. 6). UE 100 also determines calibration information for the at least one STPS transmit station, 805A (e.g., similar to 605 of FIG. 6). In the embodiment of FIG. 8A, the at least one STPS transmit station is associated with a first STPS or STPS$_1$ 450 from FIG. 4. The antenna location obtained at 800A and the calibration information determined at 805A can be performed similarly to 700A and 705A of FIG. 7A, respectively, and as such will not be described in further detail for the sake of brevity.

Referring to FIG. 8A, UE 100 determines its current location based on signals from three or more STPS transmit stations 460 that are associated with a second STPS or STPS$_2$ from FIG. 4, 810A (e.g., similar to 610 of FIG. 6). This is in contrast to FIG. 7A which used GNSS-based signals to determine location at 710A. UE 100 then estimates its time calibration value, 815A (e.g., similar to 615 of FIG. 6). In an example, the estimation of 815A can be calculated based on Equation 3 as shown below:

$$\text{Time Calibration Value} = \text{TOAmeas} - (\|\text{STPSloc} - \text{antennaloc}\| + \text{FLC}) \quad \text{Equation 3}$$

whereby TOAmeas denotes an average of the TOAs measured at 805A, STPSloc denotes the STPS-based location estimate from 810A, antennaloc denotes the antenna location obtained at 800A and FLC denotes the FLC value obtained at 805A.

Because the time calibration value is substantially constant (e.g., unless hardware and/or software on the UE 100 is changed, etc.), the UE 100 may refine the estimated time calibration value over time, 820A. The refining of 820A can include repeating 800A-815A a number of times to improve a confidence level associated with the estimated time calibration value. For example, the refining of 820A can include weighted averaging of estimated time calibration values, with weights established as shown below with respect to Equation 4:

$$\text{Weight} = \text{sqrt}(\text{TOAmeas\_UNC}^2 + \text{STPSLoc\_UNC}^2 + \text{antennaloc\_UNC}^2 + \text{FLC\_UNC}^2) \quad \text{Equation 4}$$

whereby TOAmeas_UNC, STPSLoc_UNC, antennaloc_UNC, FLC_UNC denote respective uncertainty levels in the TOAmeas, STPSloc, antennaloc and FLC, respectively.

Referring to FIG. 8A, a time calibration value for UE 100 may then be reported to the server 150 at 825A. The reporting at 825A can be implemented similarly to 725A of FIG. 7A, and will not be described further for the sake of brevity. As noted above with respect to 725A of FIG. 7A, in an alternative embodiment, the time calibration value estimated at 815A and/or refined at 820A need not be reported to the server 150 at all. Rather, UE 100 can estimate and/or refine the time calibration for its own independent use (e.g., no crowdsourcing via the server 150).

Figure 8B:
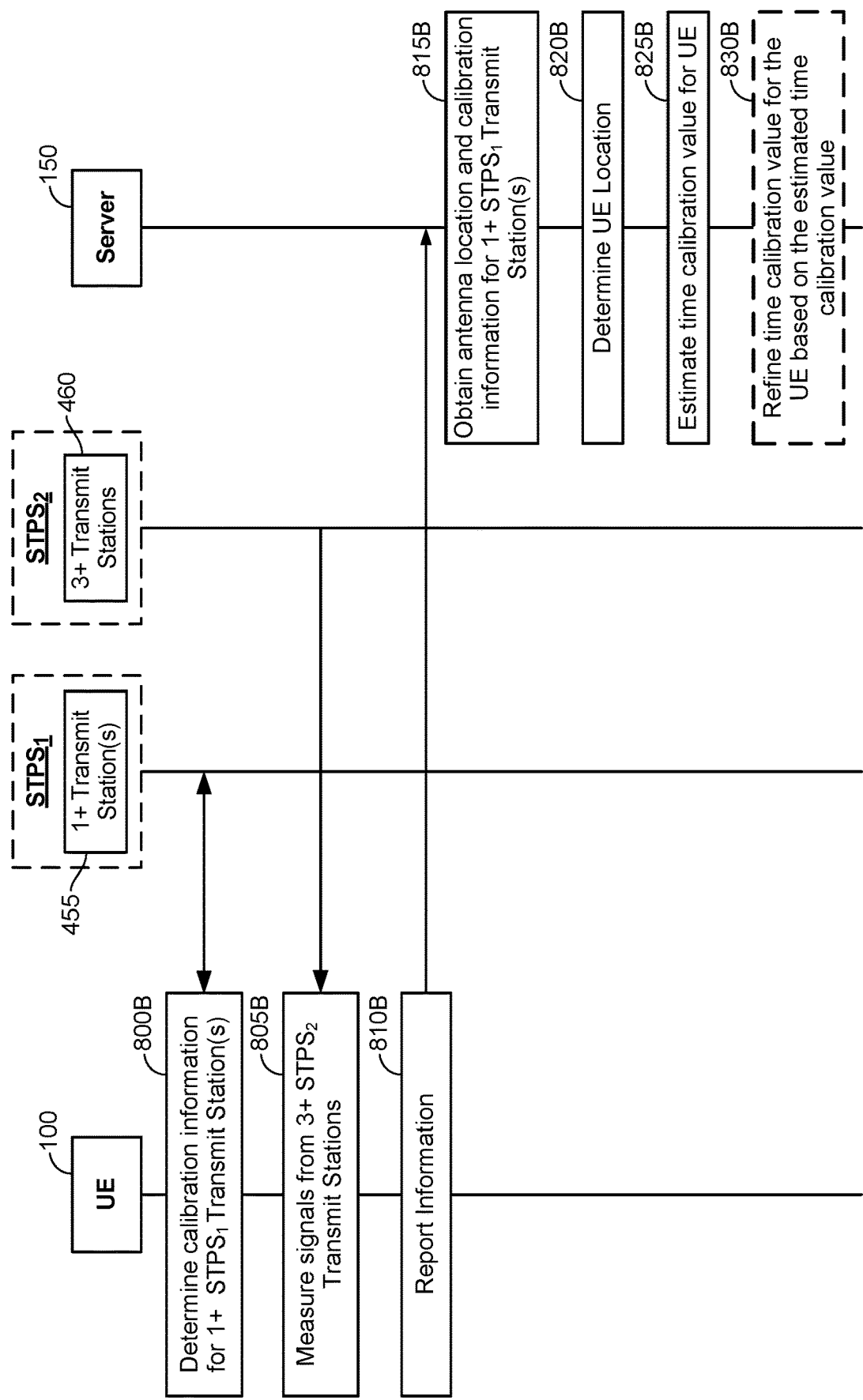
FIG. 8B illustrates an example implementation of the process of FIG. 6 being performed by a server in accordance with another embodiment of the disclosure.

FIG. 8B illustrates an example implementation of the process of FIG. 6 whereby the given entity corresponds to the server 150 in accordance with another embodiment of the disclosure. Referring to FIG. 8B, UE 100 determines calibration information for the at least one STPS transmit station 455, 800B, measures signals from three or more STPS transmit stations 460, 805B and then reports information to the server 150, 810B.

In an example, the calibration information determined at 800B can be similar to the calibration information determined at 805A of FIG. 8A. Alternatively, the actual look-up operation for some of the calibration information (e.g., such as the FLC value) may occur at the server 150 instead. Similarly, the antenna location obtained by the UE 100 at 800A of FIG. 8A can be determined at UE 100 and then reported to the server 150 at 810B, or the server 150 can look-up the antenna location on its own (e.g., based on a transmit station identifier carried in the reported information of 810B). Similarly, UE 100 may determine its location and then send the determined location to the server at 810B, or alternatively UE 100 may send the raw STPS measurements from 805B to the server 150 so that the server 150 can perform the UE location calculation.

With this in mind, the server 150 obtains the antenna location and calibration information for the at least one STPS transmit station 455, 815B (e.g., either based on extracting this information from the reported information received at 810B, or separately looking up and/or calculating the relevant information based at least in part upon the reported information from 810B), and the server 150 further determines the current location of UE 100, 820B (e.g., either based on extracting this information from the reported information received at 810B, or separately calculating the relevant information based at least in part upon raw SPTS signal measurements received at 810B). The server 150 then estimates the time calibration value for UE 100 based on Equation 3 similarly to 815A of FIG. 8A, 825B. As will be appreciated, 815B-825B correspond to an example implementation of 600-615 of FIG. 6. The server 150 then optionally refines the estimated time calibration value for UE 100, 830B (e.g., similar to 820A of FIG. 8A). In particular, the refining of 830B can include repeating 815B-825B based on different reported information from 810B a number of times to improve a confidence level associated with the estimated time calibration value. In a further example, the refinement of 830B can be optional if the estimated time calibration value happens to be associated with a very high certainty or confidence level. In yet another example, once the estimated time calibration value (refined or otherwise) exceeds a particular confidence level, the estimated time calibration value may be deemed to have matured, at which point UE 100 may be authorized to use the estimated time calibration value to compensate TOA measurements for positioning procedures (e.g., GNSS-based, STPS-based and/or hybrid positioning procedures).

Figure 9A:
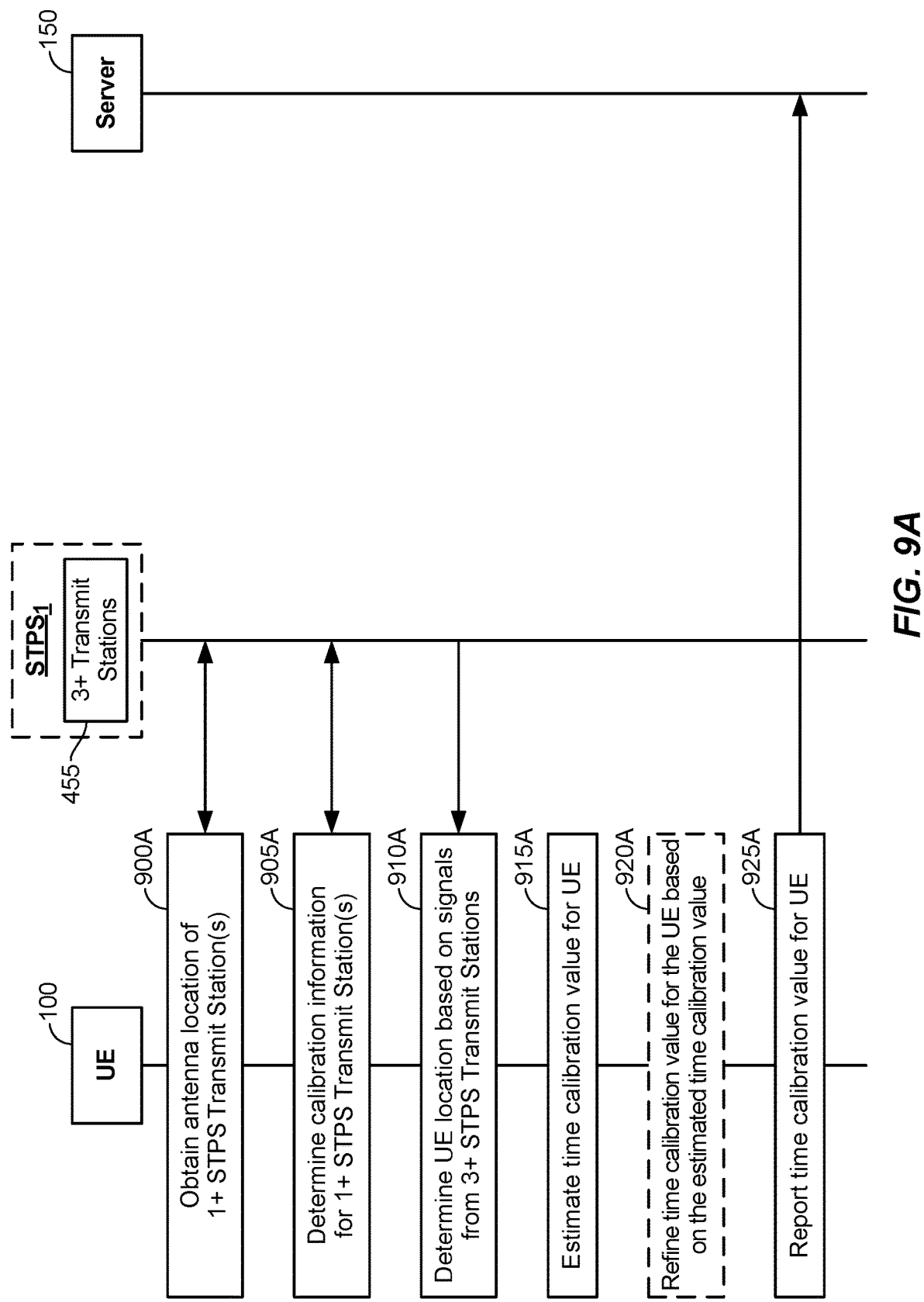
FIG. 9A illustrates an example implementation of the process of FIG. 6 being performed by the UE in accordance with another embodiment of the disclosure.

FIG. 9A illustrates an example implementation of the process of FIG. 6 whereby the given entity corresponds to the UE 100 in accordance with another embodiment of the disclosure. The process of FIG. 9A is similar to FIG. 8A, except the transmit station for which antenna location and calibration information are obtained at 900A-905A is part of the same STPS that is used to determine the location of UE 100 at 910A.

Referring to FIG. 9A, UE 100 obtains an antenna location of at least one STPS transmit station, 900A (e.g., similar to 600 of FIG. 6). UE 100 also determines calibration information for the at least one STPS transmit station, 905A (e.g., similar to 605 of FIG. 6). In the embodiment of FIG. 9A, the at least one STPS transmit station is associated with a first STPS or $STPS_1$ 450 from FIG. 4. The antenna location obtained at 900A and the calibration information determined at 905A can be performed similarly to 700A and 705A of FIG. 7A, respectively, and as such will not be described in further detail for the sake of brevity.

Referring to FIG. 9A, UE 100 determines its current location based on signals from three or more STPS transmit stations that are also associated with the first STPS or $STPS_1$ from FIG. 4, 910A (e.g., similar to 610 of FIG. 6). The three or more STPS transmit stations used to determine the location of UE 100 at 910A may or may not include the STPS transmit station for which the antenna location and calibration information are obtained at 900A-905A. UE 100 then estimates its time calibration value, 915A (e.g., similar to 615 of FIG. 6). In an example, the estimation of 915A can be calculated based on Equation 3 (above), whereby TOAmeas denotes an average of the TOAs measured at 905A, STPSloc denotes the STPS-based location estimate from 910A, antennaloc denotes the antenna location obtained at 900A and FLC denotes the FLC value obtained at 905A.

Because the time calibration value is substantially constant (e.g., unless hardware and/or software on the UE 100 is changed, etc.), the UE 100 may refine the estimated time calibration value over time, 920A. 920A is similar to 820A of FIG. 8 and will not be described further for the sake of brevity. A time calibration value for UE 100 may then be reported to the server 150 at 925A. The reporting at 925A can be implemented similarly to 725A of FIG. 7A, and will not be described further for the sake of brevity. As noted above with respect to 725A of FIG. 7A, in an alternative embodiment, the time calibration value estimated at 915A and/or refined at 920A need not be reported to the server 150 at all. Rather, UE 100 can estimate and/or refine the time calibration for its own independent use (e.g., no crowdsourcing via the server 150).

Figure 9B:
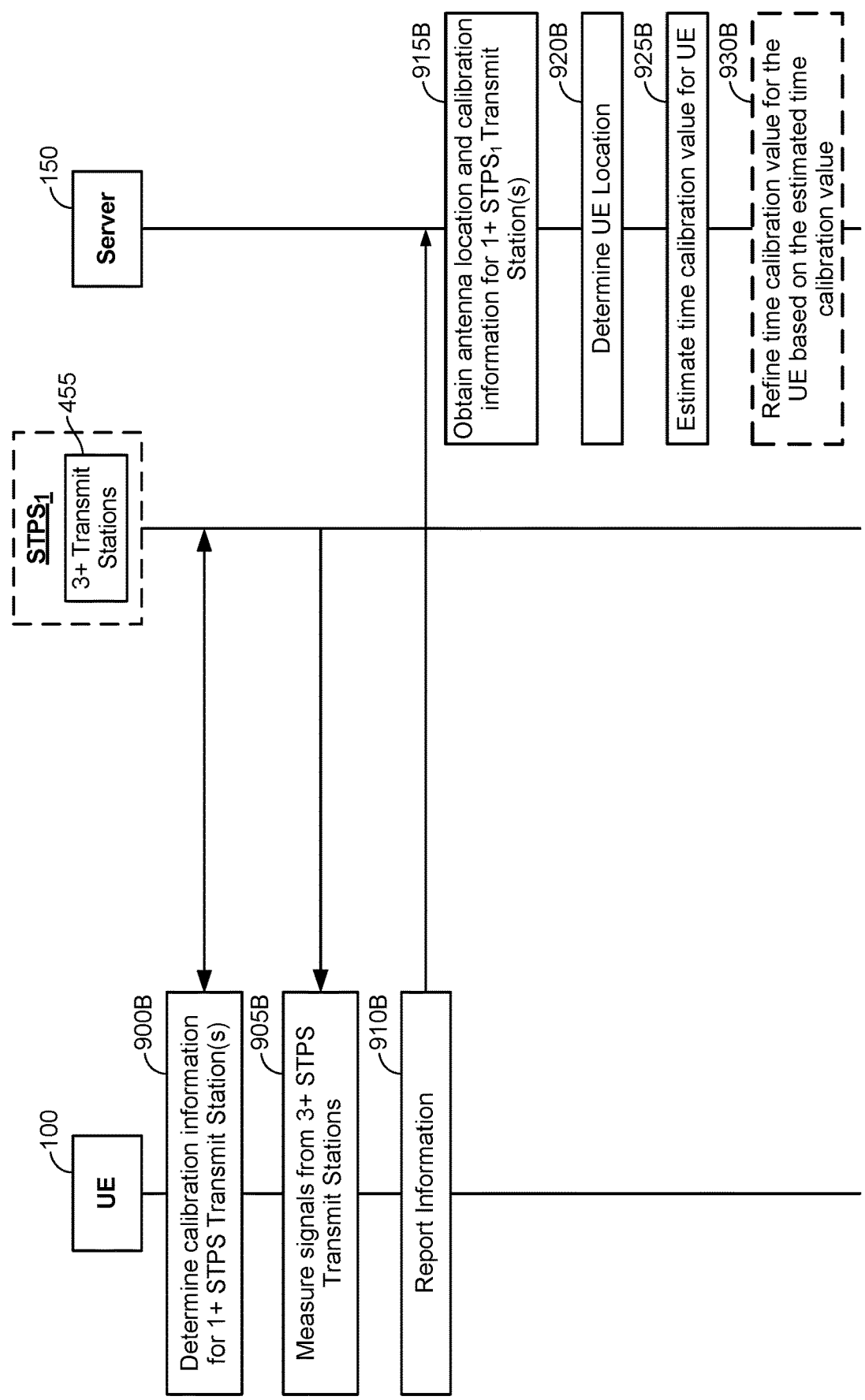
FIG. 9B illustrates an example implementation of the process of FIG. 6 being performed by a server in accordance with another embodiment of the disclosure.

FIG. 9B illustrates an example implementation of the process of FIG. 6 whereby the given entity corresponds to the server 150 in accordance with another embodiment of the disclosure. The process of FIG. 9B is similar to FIG. 3B, except the transmit station for which antenna location and calibration information are obtained at 900B and 915B is part of the same STPS (e.g., $STPS_1$) from which UE 100 measures signals at 905B. Except for this variation, 900B-930B substantially correspond to 800B-830B of FIG. 8, respectively, and will not be described further for the sake of brevity.

While FIGS. 7A-9B relate to embodiments where a location of the UE 100 is determined based on signals from one particular SWTN (e.g., a GNSS in FIGS. 7A-7B, STPS$_2$ in FIGS. 8A-8B and STPS$_1$ in FIGS. 9A-9B), alternative embodiments can implement a "hybrid" positioning scheme that relies in part upon signals from one or more STPS transmit stations as well as signals from one or more GNSS transmit stations. Further, the location of UE 100 could also be determined in accordance with one or more location determination schemes that do not rely upon any SWTN, as will be described below with respect to FIGS. 10A-10B.

FIG. 10A illustrates an example implementation of the process of FIG. 6 whereby the given entity corresponds to the UE 100 in accordance with another embodiment of the disclosure.

Referring to FIG. 10A, UE 100 obtains an antenna location of at least one STPS transmit station, 1000A (e.g., similar to 600 of FIG. 6). UE 100 also determines calibration information for the at least one STPS transmit station, 1005A (e.g., similar to 605 of FIG. 6). Instead of determining the location of UE 100 based upon signal measurements from an STPS or a GNSS, UE 100 determines its current location based independently from any STPS or GNSS, 1010A (e.g., similar to 610 of FIG. 6). Non-limiting examples of how the UE 100 can determine its location independently from a STPS or GNSS are provided as follows:

An operator of UE 100 manually enters a location of UE 100 (e.g., a street address, etc.); and/or UE 100 detects a device or object that has a known location (e.g., a mobile device whose current location was recently calculated, a fixed device such as a home appliance, etc.) via a local short-range connection (e.g., a wired connection or a short-range wireless communication connection such as Bluetooth, NFC, WiFi or WLAN, visual line of sight, etc.), such that the location of UE 100 is known to be within a threshold distance from the device;

Example #1: UE 100 can be inferred as within the threshold distance from the device based on UE 100 and the device having a round-trip time (RTT) that is below a threshold. In one instance, UE 100 may connect to a WiFi AP with an ID that can be mapped to a precise location along with a low RTT (e.g., a few milliseconds) that implies that UE 100 is very close to the WiFi AP, in which case the WiFi AP's location can be used as the location of UE 100; and/or Example #2: In a Point of Sale (POS) transaction, UE 100 may connect to a POS terminal via a local short-range connection, with the POS terminal location being known with precision;

Example #3: UE 100 uses a camera to scan a proximate QR code. The QR code may map directly to an associated location or to some type of device identifier that can be used to look-up the associated location; and/or UE 100 determines its location based on a pedestrian deck reckoning (PDR) system in an indoor environment.

UE 100 then estimates its time calibration value, 1015A (e.g., similar to 615 of FIG. 6). In an example, the estimation of 1015A can be calculated based on Equation 5 as shown below:

$$\text{Time Calibration Value} = \text{TOAmeas} - (\|\text{UEloc} - \text{antennaloc}\| + \text{FLC}) \quad \text{Equation 5}$$

whereby TOAmeas denotes an average of the TOAs measured at 1005A, UEloc denotes the non-STPS and non-GNSS UE location estimate from 1010A, antennaloc denotes the antenna location obtained at 1000A and FLC denotes the FLC value obtained at 1005A.

Because the time calibration value is substantially constant (e.g., unless hardware and/or software on the UE 100 is changed, etc.), the UE 100 may refine the estimated time calibration value over time, 1020A. The refining of 1020A can include repeating 1000A-1015A a number of times to improve a confidence level associated with the estimated time calibration value. For example, the refining of 1020A can include weighted averaging of estimated time calibration values, with weights established as shown below with respect to Equation 6:

$$\text{Weight} = \text{sqrt}(\text{TOAmeas\_UNC}^2 + \text{UEloc\_UNC}^2 + \text{antennaloc\_UNC}^2 + \text{FLC\_UNC}^2) \quad \text{Equation 6}$$

whereby TOAmeas_UNC, UELoc_UNC, antennaloc_UNC, FLC_UNC denote respective uncertainty levels in the TOAmeas, UEloc, antennaloc and FLC, respectively.

Referring to FIG. 10A, a time calibration value for UE 100 may then be reported to the server 150 at 1025A. The reporting at 1025A can be implemented similarly to 725A of FIG. 7A, and will not be described further for the sake of brevity. As noted above with respect to 725A of FIG. 7A, in an alternative embodiment, the time calibration value estimated at 1015A and/or refined at 1020A need not be reported to the server 150 at all. Rather, UE 100 can estimate and/or refine the time calibration for its own independent use (e.g., no crowdsourcing via the server 150).

Figure 10B:
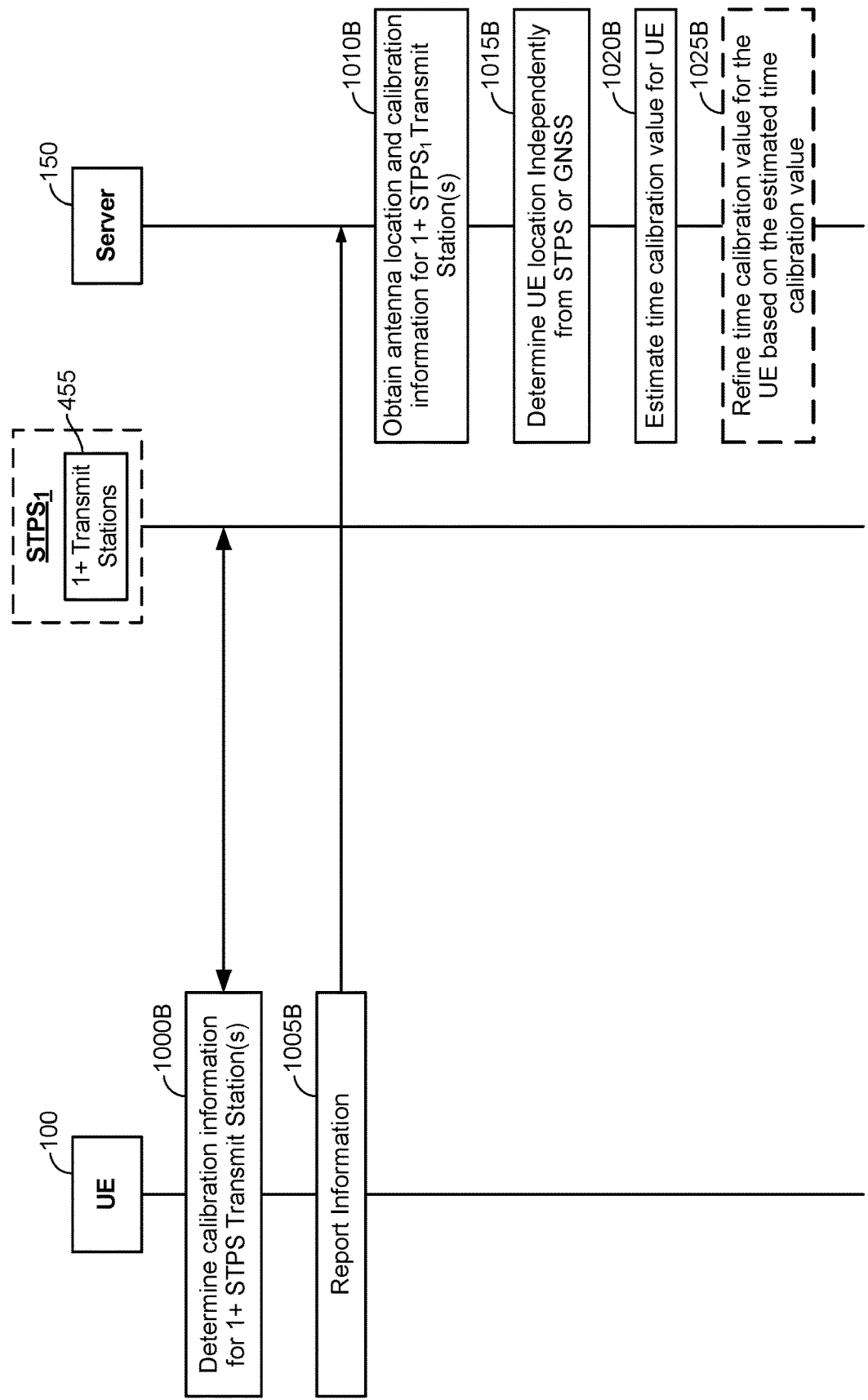
FIG. 10B illustrates an example implementation of the process of FIG. 6 being performed by a server in accordance with another embodiment of the disclosure.

FIG. 10B illustrates an example implementation of the process of FIG. 6 whereby the given entity corresponds to the server 150 in accordance with another embodiment of the disclosure. Referring to FIG. 10B, UE 100 determines calibration information for the at least one STPS transmit station 455, 1000B, and reports information to the server 150, 1005B.

In an example, the calibration information determined at 1000B can be similar to the calibration information determined at 1005A of FIG. 10A. Alternatively, the actual look-up operation for some of the calibration information (e.g., such as the FLC value) may occur at the server 150 instead. Similarly, the antenna location obtained by the UE 100 at 1000A of FIG. 10A can be determined at UE 100 and then reported to the server 150 at 1005B, or the server 150 can look-up the antenna location on its own (e.g., based on a transmit station identifier carried in the reported information of 1005B). Similarly, UE 100 may determine its location and then send the determined location to the server at 1005B (e.g., a manually user-entered street address, etc.), or alternatively UE 100 may send information by which the server 150 can determine the location of UE 100 (e.g., UE 100 reports itself as having a wired connection to a particular printer, and the server 150 can look-up a registered location associated with the printer and then use the registered location as an implicit location of UE 100).

With this in mind, the server 150 obtains the antenna location and calibration information for the at least one STPS transmit station 455, 1010B (e.g., either based on extracting this information from the reported information received at 1005B, or separately looking up and/or calculating the relevant information based at least in part upon the reported information from 1005B), and the server 150 further determines the current location of UE 100, 1015B

(e.g., either based on extracting this information from the reported information received at 1005B, or by independently calculating a location of UE 100 based on secondary information contained in the report received at 1005B). The server 150 then estimates the time calibration value for UE 100 based on Equation 5 similarly to 1015A of FIG. 10A, 1020B. As will be appreciated, 1010B-1020B correspond to an example implementation of 600-615 of FIG. 6. The server 150 then optionally refines the estimated time calibration value for UE 100, 1025B (e.g., similar to 1020A of FIG. 10A). In particular, the refining of 1025B can include repeating 1010B-1020B based on different reported information from 1005B a number of times to improve a confidence level associated with the estimated time calibration value. In a further example, the refinement of 1025B can be optional if the estimated time calibration value happens to be associated with a very high certainty or confidence level. In yet another example, once the estimated time calibration value (refined or otherwise) exceeds a particular confidence level, the estimated time calibration value may be deemed to have matured, at which point UE 100 may be authorized to use the estimated time calibration value to compensate TOA measurements for positioning procedures (e.g., GNSS-based, STPS-based and/or hybrid positioning procedures).

Figure 11:
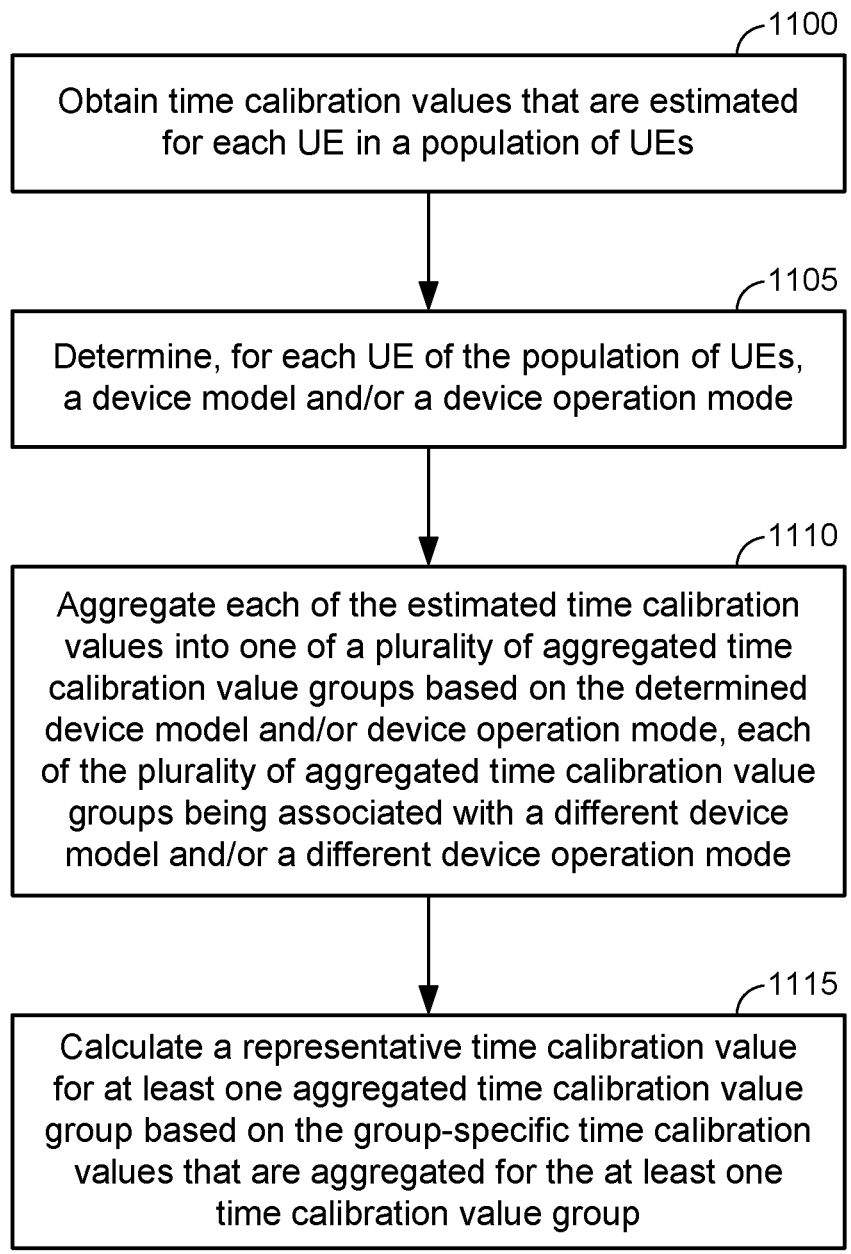
FIG. 11 illustrates a process by which estimated time calibration values are crowdsourced to permit a server to calculate a representative time calibration value to be used by a particular group of UEs in accordance with an embodiment of the disclosure.

FIGS. 6-10B each relate to processes by which time calibration values are estimated for particular UEs. As noted above, time calibration values can be similar for UEs that share certain characteristics, such as the same device model (e.g., iPhone 6, iPad 3, Samsung Galaxy S6, etc.) and/or device operation mode (e.g., iOS v5, iOS v6, Android v5.1.1, Android v6.0.1, etc.). FIG. 11 thereby relates to a process by which the estimated time calibration values are crowdsourced which permits the server 150 to calculate a representative time calibration value to be used by a particular group of UEs in accordance with an embodiment of the disclosure.

Referring to FIG. 11, the server 150 obtains time calibration values that are estimated for each UE in a population of UEs, 1100. In an example, the time calibration values obtained at 1100 can be obtained as described above with respect to any of FIGS. 6-10B (e.g., some time calibration values can be estimated at the UEs themselves and then reported to the server 150 as in FIGS. 7A, 8A, 9A and 10A, while other time calibration values can be estimated at the server 150 based on information reported from certain UEs as in FIGS. 7B, 8B, 9B and 10B, etc.). The server 150 determines, for each UE of the population of UEs, a device model and/or a device operation mode, 1105. In an example, the determination of 1105 can be based upon information reported from the UEs during the various reporting procedures described above with respect to 725A of FIG. 7A, 710B of FIG. 7B, and so on.

As used herein, a device model refers to a set of UEs that is made by the same manufacturer, whereby each UE is substantially identical to other devices of the same model except for potential hardware and/or software distinctions that do not impact processing of received signals. Device models are generally given a particular brand or identifier and potentially an associated device version identifier as well (e.g., iPhone 6, iPad 3, Galaxy S6, etc.). Device models can be configured differently (e.g., iPhone 6 is available with 16 GB, 32 GB or 64 GB of memory, iPad 3 is available with different memory configurations and an optional cellular data feature, etc.), but these configurations do not necessarily impact the respective time calibration values of the respective UE. Further, as used herein, device operation modes are defined as any type of operational mode or settings configuration being implemented at the respective UE with the potential to impact the time calibration value. Device operation modes can include a firmware version executing on the UE (e.g., iOS 5, iOS 6, Android 5.1.1, etc.), whether the UE is operating in low-power mode, an RF mode of the UE or any combination thereof. The RF mode of the UE may include a particular antenna type used by the UE, a number of antennas being used by the UE and/or other antenna configuration data. The other antenna configuration data may include a particular RF processing module being used by the UE to process incoming signals at the UE, a frequency band used by one or more of the UE's antennas (e.g., 0.7 GHz, 1.8 GHz, 1.9 GHz, etc.), a signal bandwidth of signals being transferred by one or more of the UE's antennas (e.g., 1.4 MHz, 3 MHz, 5 MHz, 15 MHz, 20 MHz, etc.), and/or any combination thereof.

Referring to FIG. 11, the server 150 aggregates each of the estimated time calibration values associated with the population of UEs into one of a plurality of aggregated time calibration value groups based on the determined device model and/or device operation mode, 1110. In particular, each aggregated time calibration value group is associated with a different device model, a different device operation mode or a combination thereof.

The server 150 calculates a representative time calibration value for at least one aggregated time calibration value group based on the group-specific time calibration values that are aggregated for the at least one time calibration value group, 1115. In an example, the representative time calibration value for a particular aggregated time calibration value group can be based upon the individual uncertainties (or confidence levels) of the estimated time calibration values that are part of the particular aggregated time calibration value group. Certain estimated time calibration values with particularly low confidence levels can even be removed from an associated aggregated time calibration value group altogether until their respective certainties improve due to refinement. The representative time calibration value for each aggregated time calibration value group is allocated an aggregate confidence level based on the individual confidence levels of the estimated time calibration values that are part of the particular aggregated time calibration value group. The server 150 may authorize or approve a representative time calibration value to be used by UEs that share a device model and/or device operation mode associated with a corresponding aggregated time calibration value group when the aggregate confidence level for the representative time calibration value rises above a threshold. Once authorized or approved, the representative time calibration value can be distributed to the UEs sharing the group-specific device model and/or device operation mode, as will be described below with respect to FIG. 12.

Figure 12:
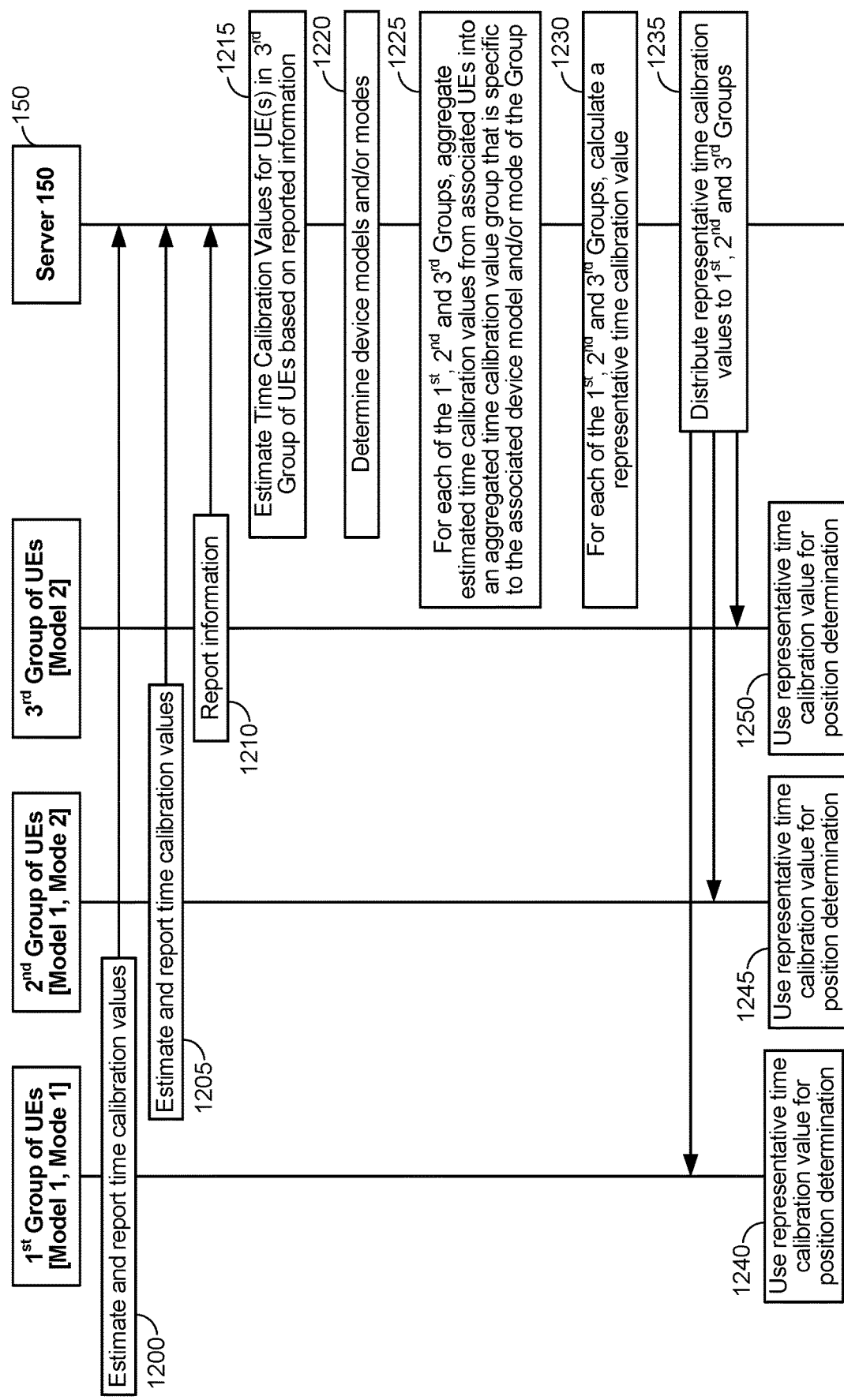
FIG. 12 illustrates an example implementation of the process of FIG. 11 in accordance with an embodiment of the disclosure.

FIG. 12 illustrates an example implementation of the process of FIG. 11 in accordance with an embodiment of the disclosure. Referring to FIG. 12, assume that first, second and third groups of UEs are deployed in a wireless communications environment. The first group of UEs is characterized as including UEs that correspond to Model 1 and Mode 1, the second group of UEs is characterized as including UEs that correspond to Model 1 and Mode 2 and the third group of UEs is characterized as including UEs that correspond to Model 2. Accordingly, the first and second groups include the same device model of UE implementing different device operation modes, while the third group includes a different device model of UE altogether.

Referring to FIG. 12, one or more UEs among the first and second groups of UEs (over time) estimate and report their respective time calibration values, 1200 and 1205 (e.g., as in 725A of FIG. 7A, 825A of FIG. 8A, 915A of FIG. 9A and/or 1025A of FIG. 10A). One or more UEs in the third group of UEs reports information, 1210 (e.g., as in 710B of FIG. 7B, 810B of FIG. 8B, 910B of FIG. 9B and/or 1005B of FIG. 10B), that is sufficient to permit the server 150 to estimate respective time calibration values for the one or more UEs in the third group, 1215 (e.g., as in 725B of FIG. 7B, 825B of FIG. 8B, 925B of FIG. 9B and/or 1020B of FIG. 10B). The UEs in the first, second and third groups do not necessarily comprise each UE in the respective groups. Rather, as will be explained below in more detail, the group-specific representative time calibration value can be distributed to UEs in the group that did not assist in the time calibration value aggregation procedure so that these UEs can also gain the benefit of obtaining the group-specific representative time calibration value for the purpose of aiding position determinations.

Referring to FIG. 12, at 1220, the server 150 determines device models and/or device operation modes for the UEs that provided the reports at 1200, 1205 and 1210 (e.g., as in 1105 of FIG. 11). At this point, assume that the server 150 is aware that the UE(s) that reported the estimated time calibration values at 1200 fall into the first group (Model 1; Mode 1), the UE(s) that reported the estimated time calibration values at 1205 fall into the second group (Model 1; Mode 2) and the UE(s) that reported the information at 1210 fall into the third group (Model 2). In an example, the group classifications can be defined by an operator, and the server 150 may include a list of device models and/or device operation modes in which to group UEs as UEs are identified.

The server 150 aggregates the estimated time calibration values determined at 1215 into one of a plurality of aggregated time calibration value groups, 1225 (e.g., as in 1110 of FIG. 11). In the embodiment of FIG. 12, there are three aggregated time calibration value groups that correspond to the first, second and third groups of UEs as described above. A representative time calibration value is calculated for each of the first, second and third groups based on their respective aggregated time calibration value group, 1230 (e.g., as in 1115).

As described above with respect to FIG. 11, each representative time calibration value can be associated with a particular confidence level, and the server 150 can trigger distribution of a particular representative time calibration value once the associated confidence value rises above a threshold. At 1235, assume that the confidence value threshold has been exceeded for the representative time calibration values of the first, second and third groups. Accordingly, the server 150 distributes the representative time calibration values of the first, second and third groups to UEs in the first, second and third groups, 1235. As noted above, the UEs to which the representative time calibration values can include UEs that happen to be in the associated group that did not actually report information at 1200-1210, although the representative time calibration values can certainly be reported to these participating UEs as well. UEs among the first, second and third groups may then begin to use their respective group-specific representative time calibration value for position determination procedures, 1240, 1245 and 1250. For example, any raw TOA measurements used in a GNSS-based position determination procedure, a STPS-based positioning procedure or a hybrid position determination procedure may be modified as shown below with respect to Equation 7:

$$TOACal = TOARaw - TimeCalibrationValue \qquad \text{Equation 7}$$

whereby TOARaw denotes a "raw" measured TOA from the GNSS or STPS, the TimeCalibrationValue denotes the group-specific representative time calibration value distributed at 1235 and TOACal indicates the calibrated TOA value that can be used as an input to the positioning algorithm.

While not shown expressly in FIG. 11 or 12, the representative time calibration values can continue to be refined after distribution, and may be updated from time to time. Also, device operation modes can change over time (e.g., a UE can upgrade to a newer version of software, etc.) which can trigger association with a new group that triggers distribution of a new representative time calibration value that is configured for use with the new group.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of calculating a time calibration value for a user equipment (UE) at a given entity, comprising:
   obtaining a known location of at least one terrestrial transmit station of a first Synchronized Terrestrial Positioning System (STPS);
   determining transmit station calibration information associated with the at least one terrestrial transmit station, the transmit station calibration information comprising at least one Forward Link Calibration (FLC) value that is specific to the at least one terrestrial transmit station;
   determining a location of the UE that is in wireless communication range with the at least one terrestrial transmit station; and
   calculating the time calibration value for the UE based at least on the at least one FLC value and a difference between the obtained known location of the at least one terrestrial transmit station and the determined location of the UE,
   wherein the time calibration value is a time offset in time of arrival at the UE due to radio frequency (RF) processing in a receiver of the UE.

2. The method of claim 1, wherein the determining determines the location of the UE based on signals from at least one transmit station of at least one Synchronized Wireless Transmission Network (SWTN).

3. The method of claim 2, wherein the at least one SWTN includes a Global Navigation Satellite System (GNSS).

4. The method of claim 3, wherein the transmit station calibration information includes the at least one FLC value and at least one Time of Arrival (TOA) value related to one or more signals received at the UE from the at least one terrestrial transmit station.

5. The method of claim 3, wherein the calculating of the time calibration value requires the obtained known transmit station location to include at least one known transmit station location.

6. The method of claim 3, wherein the at least one SWTN further includes the first STSP and/or a second STSP that includes one or more terrestrial transmit stations.

7. The method of claim 2, wherein the at least one SWTN includes the first STSP and/or a second STSP that includes one or more terrestrial transmit stations.

8. The method of claim 7, wherein the transmit station calibration information includes a set of FLC values and a set of Time of Arrival (TOA) values related to signals received at the UE from the at least one terrestrial transmit station.

9. The method of claim 7, wherein the calculating of the time calibration value requires the obtained known transmit station location to include at least three known transmit station locations.

10. The method of claim 7, wherein the first and/or second STSP is a cellular network, a synchronized Wireless Local Area Network (WLAN), or any combination thereof.

11. The method of claim 2,
    wherein the at least one SWTN is frequency-synchronized, or
    wherein the at least one SWTN is both frequency-synchronized and time-synchronized.

12. The method of claim 1, wherein the location of the UE is determined independently from signals from any Global Navigation Satellite System (GNSS) and any STPS.

13. The method of claim 12, wherein the calculating of the time calibration value requires the obtained known transmit station location to include at least three known transmit station locations.

14. The method of claim 1, wherein the given entity corresponds to a server.

15. The method of claim 14,
    wherein the determining of the location of the UE includes:
        receiving, from the UE, (i) UE-based measurements of signals from at least one transmit station of at least one Synchronized Wireless Transmission Network (SWTN) for which the server can derive the location of the UE and/or (ii) a UE-derived location of the UE.

16. The method of claim 14, further comprising:
    refining the calculated time calibration value by repeating the calculating, based on updated transmit station calibration information and an updated location determination associated with the UE, a number of times in order to improve a confidence level associated with the calculated time calibration value; and establishing the refined calculated time calibration value as a representative time calibration value for the UE in response to the confidence level rising above a threshold.

17. The method of claim 1, wherein the given entity corresponds to the UE.

18. The method of claim 17, further comprising: reporting the calculated time calibration value to a server.

19. The method of claim 18,
wherein the reporting is performed each time the calculating is performed, or
wherein the reporting includes:
refining the calculated time calibration value by repeating the calculating, based on updated transmit station calibration information and an updated location determination associated with the UE, a number of times in order to improve a confidence level associated with the calculated time calibration value, and reporting the refined calculated time calibration value to the server in response to the confidence level rising above a threshold.

20. The method of claim 18, further comprising:
receiving, from the server, an indication of a representative time calibration value that is based upon one or more reported time calibration values from a set of UEs sharing the same device model and/or device operation mode; and
estimating a new location of the UE based on the representative time calibration value.

21. The method of claim 1, wherein the calculated time calibration value remains substantially constant for the UE over time unless hardware and/or software on the UE is changed irrespective of whether the UE changes location.

22. A given entity configured to calculate a time calibration value for a user equipment (UE), comprising:
means for obtaining a known location of at least one terrestrial transmit station of a first Synchronized Terrestrial Positioning System (STPS);
means for determining transmit station calibration information associated with the at least one terrestrial transmit station, the transmit station calibration information comprising at least one Forward Link Calibration (FLC) value that is specific to the at least one terrestrial transmit station;
means for determining a location of the UE that is in wireless communication range with the at least one terrestrial transmit station; and
means for calculating the time calibration value for the UE based at least on the at least one FLC value and a difference between the obtained known location of the at least one terrestrial transmit station and the determined location of the UE,
wherein the time calibration value is a time offset in time of arrival at the UE due to radio frequency (RF) processing in a receiver of the UE.

23. The given entity of claim 22, wherein the location of the UE is determined based on signals from at least one transmit station of at least one SWTN.

24. The given entity of claim 23,
wherein the at least one SWTN includes a Global Navigation Satellite System (GNSS), or
wherein the at least one SWTN includes the STPS and/or a second STSP that includes one or more terrestrial transmit stations, or
any combination thereof.

25. The given entity of claim 22, wherein the location of the UE is determined independently from signals from any Global Navigation Satellite System (GNSS) and any STPS.

26. The given entity of claim 22,
wherein the given entity corresponds to a server, or
wherein the given entity corresponds to the UE.

27. The given entity of claim 22, further comprising:
means for reporting the calculated time calibration value to a server.

28. The given entity of claim 27, further comprising:
means for receiving, from the server, an indication of a representative time calibration value that is based upon one or more reported time calibration values from a set of UEs sharing the same device model and/or device operation mode; and
means for estimating a new location of the UE based on the representative time calibration value.

29. A given entity configured to calculate a time calibration value for a user equipment (UE), comprising:
a memory; and
a processor communicatively coupled to the memory, the processor configured to:
obtain a known location of at least one terrestrial transmit station of a Synchronized Terrestrial Positioning System (STPS);
determine transmit station calibration information associated with the at least one terrestrial transmit station, the transmit station calibration information comprising at least one Forward Link Calibration (FLC) value that is specific to the at least one terrestrial transmit station;
determine a location of the UE that is in wireless communication range with the at least one terrestrial transmit station; and
calculate the time calibration value for the UE based at least on the at least one FLC value and a difference between the obtained known location of the at least one terrestrial transmit station and the determined location of the UE,
wherein the time calibration value is a time offset in time of arrival at the UE due to radio frequency (RF) processing in a receiver of the UE.

30. A non-transitory computer-readable medium containing instructions stored thereon, which, when executed by a given entity configured to calculate a time calibration value for a user equipment (UE), cause the given entity to perform operations, the instructions comprising:
at least one instruction to cause the given entity to obtain a known location of at least one terrestrial transmit station of a Synchronized Terrestrial Positioning System (STPS);
at least one instruction to cause the given entity to determine transmit station calibration information associated with the at least one terrestrial transmit station, the transmit station calibration information comprising at least one Forward Link Calibration (FLC) value that is specific to the at least one terrestrial transmit station;
at least one instruction to cause the given entity to determine a location of the UE that is in wireless communication range with the at least one terrestrial transmit station; and
at least one instruction to cause the given entity to calculate the time calibration value for the UE based at least on the at least one FLC value and a difference between the obtained known location of the at least one terrestrial transmit station and the determined location of the UE, wherein the time calibration value is a time offset in time of arrival at the UE due to radio frequency (RF) processing in a receiver of the UE.

* * * * *